(12) United States Patent
Lei et al.

(10) Patent No.: US 10,352,719 B2
(45) Date of Patent: Jul. 16, 2019

(54) PARKING SPACE NAVIGATION METHOD, PARKING SPACE MANAGEMENT METHOD, MOBILE TERMINAL, AND SERVER

(71) Applicants: CHONGQING UNIVERSITY OF POSTS AND TELECOMMUNICATIONS, Chongqing (CN); TENCENT TECHNOLOGY (SHENZHEN) COMPANY LIMITED, Shenzhen, Guangdong (CN)

(72) Inventors: Jianjun Lei, Guangdong (CN); Yuan He, Guangdong (CN); Mingwei Xiao, Guangdong (CN); Shengwen Luo, Guangdong (CN); Huaming Wang, Guangdong (CN)

(73) Assignees: CHONGQING UNIVERSITY OF POSTS AND TELECOMMUNICATIONS, Chongqing (CN); TENCENT TECHNOLOGY (SHENZHEN) COMPANY LIMITED, Guangdong (CN)

(*) Notice: Subject to any disclaimer, the term of this patent is extended or adjusted under 35 U.S.C. 154(b) by 0 days.

(21) Appl. No.: 15/566,758

(22) PCT Filed: Jun. 15, 2016

(86) PCT No.: PCT/CN2016/085874
§ 371 (c)(1),
(2) Date: Oct. 16, 2017

(87) PCT Pub. No.: WO2017/071235
PCT Pub. Date: May 4, 2017

(65) Prior Publication Data
US 2018/0128638 A1 May 10, 2018

(30) Foreign Application Priority Data

Oct. 30, 2015 (CN) .......................... 2015 1 0726808

(51) Int. Cl.
*G08G 1/14* (2006.01)
*G01C 21/36* (2006.01)
(Continued)

(52) U.S. Cl.
CPC ....... *G01C 21/3685* (2013.01); *G06Q 20/145* (2013.01); *G06Q 20/3224* (2013.01);
(Continued)

(58) Field of Classification Search
CPC .......... G08G 1/14; G08G 1/141; G08G 1/143; G08G 1/145; G08G 1/144; G08G 1/146;
(Continued)

(56) References Cited

U.S. PATENT DOCUMENTS 6,927,700 B1 *  8/2005  Quinn ................... G08G 1/14
                                              340/468
8,830,088 B2 *  9/2014  Hod ................... G01S 7/52004
                                              340/932.2
(Continued)

FOREIGN PATENT DOCUMENTS

CN  103226896 A  7/2013
CN  203386372 U  1/2014
(Continued)

OTHER PUBLICATIONS

International Search Report for PCT/CN2016/085874 dated Sep. 14, 2016 [PCT/ISA/210].
(Continued)

*Primary Examiner* — Hung T Nguyen
(74) *Attorney, Agent, or Firm* — Sughrue Mion, PLLC

(57) ABSTRACT

A parking space navigation method is provided. The method includes obtaining and displaying a parking space distribu-
(Continued)

tion map of a parking lot by using a mobile terminal; querying current existing vacant parking spaces of the parking lot from a server; marking the current existing vacant parking spaces on the parking space distribution map; determining a target vacant parking space from the marked current existing vacant parking spaces; obtaining, from the server, a first position of a terminal node associated with the mobile terminal when the terminal node is placed on a vehicle; and drawing, on the parking space distribution map, a navigation route from the first position to the target vacant parking space.

14 Claims, 12 Drawing Sheets

(51) Int. Cl.
*H04W 4/48* (2018.01)
*G08G 1/04* (2006.01)
*G07B 15/04* (2006.01)
*G07B 15/02* (2011.01)
*G06Q 30/06* (2012.01)
*G07F 17/24* (2006.01)
*G06Q 20/14* (2012.01)
*G06Q 20/32* (2012.01)

(52) U.S. Cl.
CPC .............. *G06Q 30/06* (2013.01); *G07B 15/02* (2013.01); *G07B 15/04* (2013.01); *G07F 17/246* (2013.01); *G08G 1/04* (2013.01); *G08G 1/143* (2013.01); *G08G 1/145* (2013.01); *G08G 1/146* (2013.01); *H04W 4/48* (2018.02)

(58) Field of Classification Search
CPC ........ G08G 1/04; B60Q 1/48; G01C 21/3685; G01C 21/36; H04W 4/48; G07F 17/246
USPC ............. 340/539.11, 932.2, 943; 367/93, 95; 701/2
See application file for complete search history.

(56) References Cited

U.S. PATENT DOCUMENTS

| | | | |
|---|---|---|---|
| 2004/0252034 A1* | 12/2004 | Slemmer | G08G 1/14 340/932.2 |
| 2008/0136674 A1 | 6/2008 | Jang et al. | |
| 2012/0044091 A1* | 2/2012 | Kim | G08G 1/143 340/932.2 |
| 2012/0274482 A1* | 11/2012 | Chen | G08G 1/144 340/932.2 |
| 2014/0112101 A1* | 4/2014 | Rodrich | G01S 15/04 367/93 |
| 2014/0320318 A1* | 10/2014 | Victor | G08G 1/142 340/932.2 |
| 2016/0275794 A1* | 9/2016 | Chang | G08G 1/146 |

FOREIGN PATENT DOCUMENTS

| | | |
|---|---|---|
| CN | 204117370 U | 1/2015 |
| CN | 103606300 A | 2/2015 |
| CN | 104537886 A | 4/2015 |
| CN | 104616526 A | 5/2015 |
| CN | 204348091 U | 5/2015 |
| CN | 104778858 A | 7/2015 |
| CN | 106033645 A | 10/2016 |
| JP | 4219752 B2 | 2/2009 |
| JP | 4807082 B2 | 11/2011 |

OTHER PUBLICATIONS

Communication dated Sep. 30, 2018 in corresponding Chinese Application No. 201507268082.
Communication dated Jan. 29, 2018 issued by the State Intellectual Property Office in People's Republic of China in counterpart application No. 201510726808.2.
Communication dated Mar. 19, 2019 from the State Intellectual Property Office of the P.R.C. in application No. 201510726808.2.

* cited by examiner

PARKING SPACE NAVIGATION METHOD, PARKING SPACE MANAGEMENT METHOD, MOBILE TERMINAL, AND SERVER

CROSS REFERENCE TO RELATED APPLICATION

This application is a National Stage of International Application No. PCT/CN2016/085874, filed on Jun. 15, 2016, which claims priority from Chinese Patent Application No. 201510726808.2, entitled "PARKING SPACE NAVIGATION METHOD, APPARATUS, AND SYSTEM, AND PARKING SPACE MANAGEMENT METHOD AND APPARATUS" filed on Oct. 30, 2015, the entire disclosure of each is incorporated by reference in its entirety.

FIELD

The present disclosure relates to automatic management technologies of parking lots, and in particular, to a parking space navigation method, a parking space management method, a mobile terminal, and a server.

BACKGROUND

With popularization of vehicle manufacturing technologies and economic development, a growing number of people purchase vehicles for transportation, and this provides enormous convenience for people's life, and demands of people for parking spaces of parking lots also constantly increase.

Currently, automatic management solutions that are currently applied to parking lots consider only vehicles entering and exiting from a parking lot, because the entrance and exit involves fee collection, and current automatic management solutions are more concerned about fee collection. There are few solutions for automatically managing parking spaces. For example, currently, there is a parking space management solution. A vehicle counting apparatus is disposed at an entrance/exit of a parking lot. The vehicle counting apparatus may determine the number of vehicles in the parking lot when a vehicle enters and exits from the parking lot, and compare the number of vehicles in the parking lot with the number of parking spaces in the parking lot to determine whether there is a vacant parking space in the parking lot, and notify a vehicle owner of the number of vacant parking spaces. In this way, the vehicle owner may drive into the parking lot to find a parking spot by himself/herself when learning that there is a vacant parking space in the parking lot.

However, there are several disadvantages in the current parking space management solution. For example, it takes a lot of time for the vehicle owner to drive around in the parking lot to find a parking space, and thus the efficiency of finding a parking space is low. The efficiency continues to decrease as the structure of the parking lot becomes more complex.

SUMMARY

It is an aspect to provide a parking space navigation method, a parking space management method, a mobile terminal, and a server that address the above disadvantages.

According to an aspect of one or more exemplary embodiments, there is provided a parking space navigation method, performed by a mobile terminal, the method comprising obtaining and displaying a parking space distribution map of a parking lot by using a mobile terminal; querying current existing vacant parking spaces of the parking lot from a server; marking the current existing vacant parking spaces on the parking space distribution map; determining a target vacant parking space from the marked current existing vacant parking spaces; obtaining, from the server, a first position of a terminal node associated with the mobile terminal when the terminal node is placed on a vehicle; and drawing, on the parking space distribution map, a navigation route from the first position to the target vacant parking space.

According to an aspect of one or more exemplary embodiments, there is provided a parking space management method performed by a server, the method comprising receiving a vacant parking space query request from a mobile terminal; in response to the request, querying current existing vacant parking spaces of a parking lot according to the vacant parking space query request, and transmitting the current existing vacant parking spaces to the mobile terminal; receiving a vacant parking space selection command from the mobile terminal; determining a target vacant parking space from the current existing vacant parking spaces according to the vacant parking space selection command; obtaining a first position of a terminal node associated with the mobile terminal when the terminal node is placed on a vehicle; and sending the first position to the mobile terminal for the mobile terminal to draw, on the parking space distribution map of the parking lot, a navigation route from the first position to the target vacant parking space.

According to an aspect of one or more exemplary embodiments, there is provided a mobile terminal comprising at least one microprocessor and a memory storing instructions which, when executed by the microprocessor, cause the microprocessor to obtain and display a parking space distribution map of a parking lot; query current existing vacant parking spaces of the parking lot from a server; mark the current existing vacant parking spaces on the parking space distribution map; determine a target vacant parking space from the current existing vacant parking spaces; obtain, from the server, a first position of a terminal node associated with the mobile terminal when the terminal node is placed on a vehicle; and draw, on the parking space distribution map, a navigation route from the first position to the target vacant parking space.

According to an aspect of one or more exemplary embodiments, there is provided a server comprising at least one microprocessor and a memory storing instructions which, when executed by the microprocessor, cause the microprocessor to receive a vacant parking space query request from a mobile terminal; in response to the request, query current existing vacant parking spaces of a parking lot according to the vacant parking space query request, and transmit the current existing vacant parking spaces to the mobile terminal; receive a vacant parking space selection command from the mobile terminal; determine a target vacant parking space from the current existing vacant parking spaces according to the vacant parking space selection command; obtain a first position of a terminal node associated with the mobile terminal when the terminal node is placed on a vehicle; and send the first position to the mobile terminal for the mobile terminal to draw, on the parking space distribution map of the parking lot, a navigation route from the first position to the target vacant parking space.

BRIEF DESCRIPTION OF THE DRAWINGS

The above and other aspects will become more apparent to those of ordinary skill in the art by describing in detail exemplary embodiments thereof with reference to the accompanying drawings, in which.

DETAILED DESCRIPTION

To make the objective, technical solutions, and advantages of this application clearer, this application is further described below in detail with reference to the accompanying drawings and exemplary embodiments. It should be understood that the specific exemplary embodiments described herein are only used to explain this application, rather than limit this application.

Figure 1:
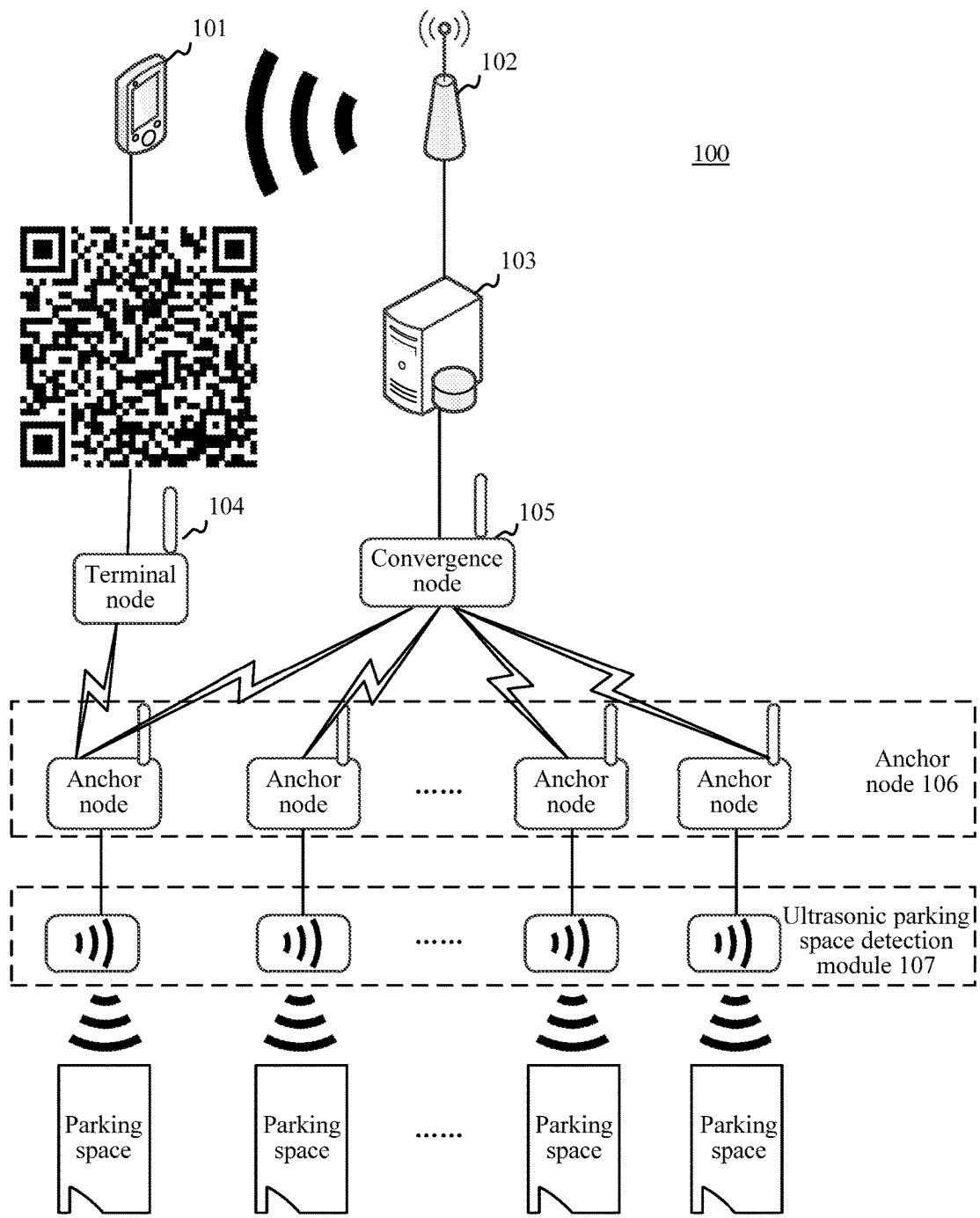
FIG. 1 is a diagram of an application environment of a parking space navigation system according to an exemplary embodiment.

As shown in FIG. 1, according to an exemplary embodiment, a parking space navigation system 100 is provided, including a mobile terminal 101, a wireless access point 102, a server 103, a terminal node 104, a convergence node 105, and anchor nodes 106.

The mobile terminal 101 is a user handheld device, and may be a mobile phone, a tablet computer, a personal digital assistant (PDA), or a wearable device. The wearable device may be a device that may be worn by a user and connected to a network such as a smart watch, a smart band, or intelligent glasses.

Figure 2:
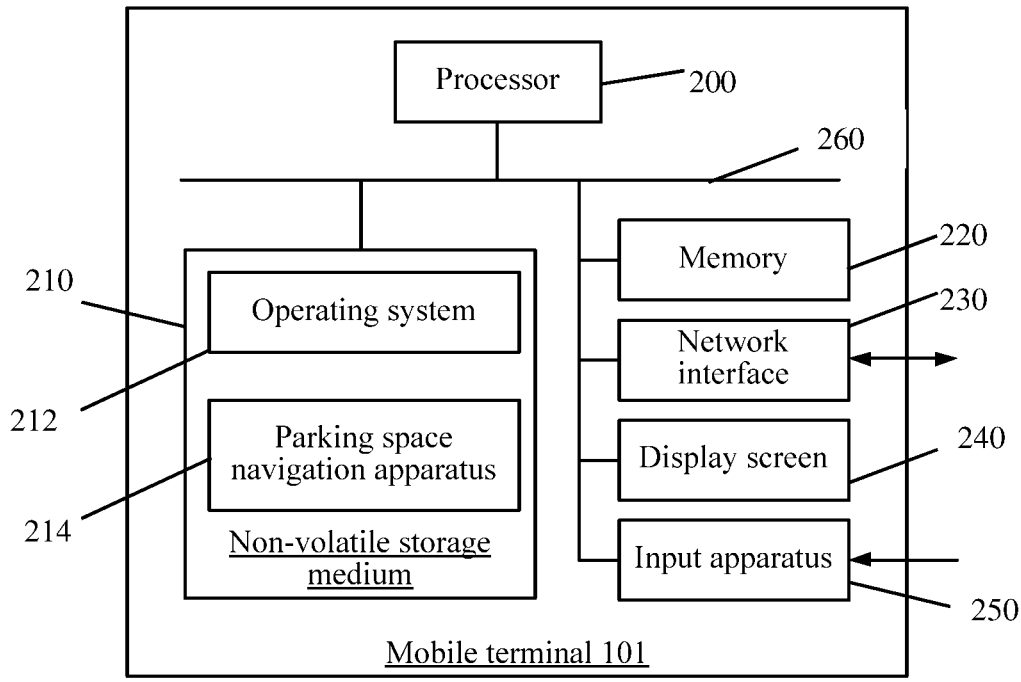
FIG. 2 is a schematic structural diagram of a mobile terminal according to an exemplary embodiment.

As shown in FIG. 2, according to an exemplary embodiment, the mobile terminal 101 includes a processor 200, a non-volatile storage medium 210, a memory 220, a network interface 230, a display screen 240, and an input apparatus 250 that are connected by using a system bus 260. The processor 200 has a calculation function and a function of controlling work of the mobile terminal 101. The processor 200 may include one or more microprocessors. The processor 200 is configured to perform a parking space navigation method. The non-volatile storage medium 210 includes at least one of a magnetic storage medium, an optical storage medium, or a flash memory storage medium. The non-volatile storage medium 210 stores an operating system 212 and a parking space navigation apparatus 214. The parking space navigation apparatus 214 is configured to, in conjunction with the processor 200, perform a parking space navigation method. The memory 220 is configured to provide a cache for running of the operating system 212 and the parking space navigation apparatus 214. The network interface 230 is configured to be connected to the server 103, and specifically, may be connected to the server 103 by using a wireless access point 102. The display screen 240 includes at least one of a liquid crystal display screen, a flexible display screen, or an electronic ink display screen. The input apparatus 250 includes at least one of a physical button, a track ball, a touch panel, or a touch layer overlapping with the display screen. The touch layer is combined with the display screen to form a touchscreen.

Figure 3:
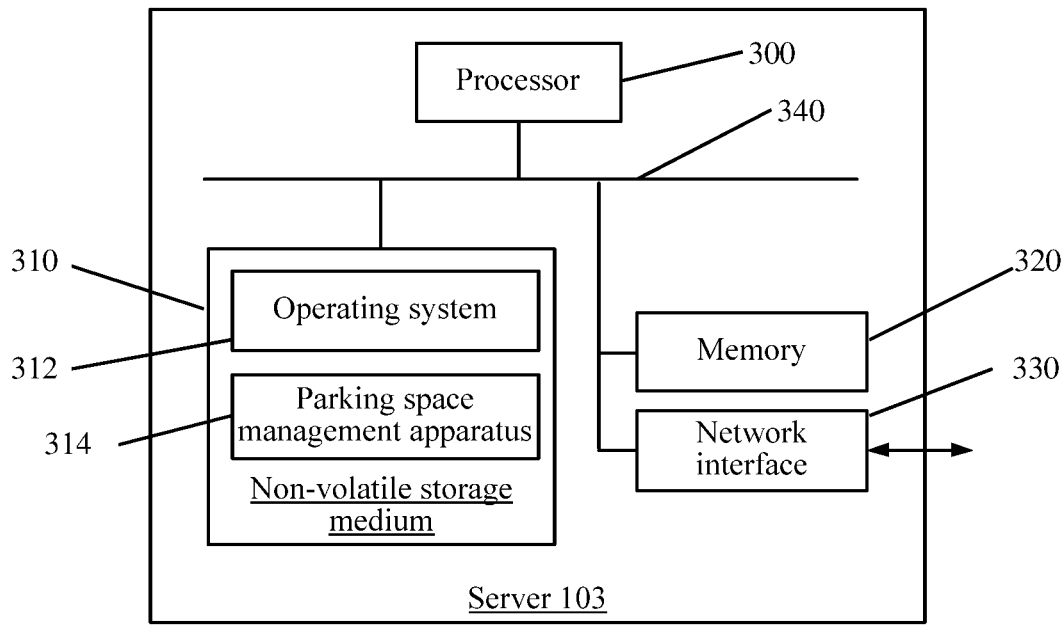
FIG. 3 is a schematic structural diagram of a server according to an exemplary embodiment.

As shown in FIG. 3, according to an exemplary embodiment, the server 103 includes a processor 300, a non-volatile storage medium 310, a memory 320, and a network interface 330 that are connected by using a system bus 340. The processor 300 is configured to perform a parking space management method. The processor 300 may include one or more microprocessors. The non-volatile storage medium 310 stores an operating system 312 and a parking space management apparatus 314. The parking space management apparatus 314 is configured to perform a parking space management method. The memory 320 is configured to provide a cache for running of the operating system 312 and the parking space management apparatus 314. The network interface 330 is configured to be connected to the wireless access point 102 and the convergence node 105, and may be a serial interface.

The terminal node 104, the convergence node 105, and the anchor nodes 106 may perform network organization by themselves to form a wireless sensor network. The wireless sensor network is a distributed sensing network, and a stub thereof is a sensor capable of sensing an environment. The terminal node 104, the convergence node 105, and the anchor nodes 106 are sensor nodes of the wireless sensor network. ZigBee (a low power-consuming local area network protocol based on IEEE802.15.4 Standard) or Bluetooth Protocol may be used among the terminal node 104, the convergence node 105, and the anchor nodes 106 to perform wireless communication. Correspondingly, the terminal node 104, the convergence node 105, and the anchor nodes 106 may be ZigBee node modules or Bluetooth node modules.

The terminal node 104 may also be referred to as a beacon node. The terminal node 104 is an electronic device whose position is variable and whose specific position is measured in the wireless sensor network, may be made into a shape of a vehicle parking card, and may be taken by a driver of a vehicle, namely, a vehicle owner, when the vehicle enters a parking lot. The terminal node 104 has a graphic code, which may be a bar code or a two-dimensional code.

The anchor nodes 106 are electronic devices, whose positions are fixed and which provide reference for measurement of the position of the terminal node 104, in the wireless sensor network. The anchor nodes 106 may be fixed in the parking lot in a dispersed manner, and specifically may be disposed on a parking lot ceiling, a parking lot ceiling interlayer, or a parking lot ground. The anchor nodes 106 may be disposed one-to-one corresponding to parking spaces in the parking lot, and specifically, a corresponding anchor node 106 may be disposed on a ground of each parking space, a parking lot ceiling above the parking space, or a parking lot ceiling interlayer. For example, the parking lot ceiling interlayer may be a beam or other structure associated with the parking space.

The convergence node 105 is a port for communication between the wireless sensor network and the server 103, and may be directly connected to the server 103 by using a serial interface. The wireless access point 102, the server 103, and the convergence node 105 may be placed, for example, in an equipment room of the parking lot.

According to an exemplary embodiment, the terminal node 104 has a graphic code for broadcasting a wireless signal. The mobile terminal 101 is configured to scan the graphic code to obtain an identifier of the terminal node 104, and upload the identifier of the terminal node 104 and an identifier of the mobile terminal 101 to the server 103 to establish an association. At least three anchor nodes 106 that are fixed in the parking lot in a dispersed manner are configured to receive the wireless signal broadcast by the terminal node 104, generate positioning information of the terminal node 104 according to the wireless signal, and transmit the positioning information to the convergence node 105. The convergence node 105 is configured to receive the positioning information, transmitted by the anchor nodes 106, of the terminal node 104, and transmit the positioning information of the terminal node 104 to the server 103. The server 103 is configured to obtain, according to the positioning information of the terminal node 104, a first position of the terminal node 104 associated with the mobile terminal 101 when the terminal node 104 is placed on the vehicle, and send the first position to the mobile terminal 101. The mobile terminal 101 is further configured to draw, on a parking space distribution map of the parking lot, a navigation route from the first position to a target vacant parking space.

According to an exemplary embodiment, the server 103 is further configured to record a parking position when the first position reaches the target vacant parking space, and/or an ultrasonic parking space detection module corresponding to the target vacant parking space detects that the vehicle reaches the target vacant parking space. The server 103 provides the parking position to the mobile terminal 101, obtains a second position of the terminal node 104 when the terminal node 104 is carried by the vehicle owner, and sends the second position to the mobile terminal 101. The mobile terminal 101 is further configured to draw, on the parking space distribution map, a navigation route from the second position to the parking position.

According to an exemplary embodiment, the parking space navigation system 100 further includes ultrasonic parking space detection modules 107, disposed one-to-one corresponding to the parking spaces. The ultrasonic parking space detection modules 107 are connected to the anchor nodes 106, and may be made into an integral product together with the anchor nodes 106. The ultrasonic parking space detection module 107 has a circuit that sends and receives ultrasonic waves, and performs ranging according to a difference between time of ultrasonic wave transmission and time of ultrasonic wave reception, so as to detect, according to a ranging result, whether the vehicle has reached a target parking space and notify the server 103.

According to an exemplary embodiment, the positioning information of the terminal node 104 includes a received signal strength indication (RSSI) of the wireless signal that is broadcast by the terminal node 104 and received by the corresponding anchor nodes 106 106, and the server 103 is further configured to optimize the RSSI by using a Gaussian model to obtain an optimized RSSI and calculate optimized ranging data, and obtain the first position of the terminal node 104 according to the optimized ranging data and coordinates of the corresponding anchor nodes 106 by using a trilateral positioning algorithm.

According to an exemplary embodiment, the mobile terminal 101 is further configured to obtain a duration starting from a time when the vehicle enters the parking lot to time when the vehicle leaves the parking lot, obtain and display a fee value to be paid and corresponds to the duration, obtain an identifier of a payment account and an identifier of a payee account, trigger a payment request including the identifier of the payment account and the identifier of the payee account, and send the payment request to a payment platform, and receive and display feedback information that is of a payment success and that is sent by the payment platform after the payment platform transfers, according to the payment request, the fee value from the payment account to the payee account. In some exemplary embodiments, the display feedback information may be of a payment failure.

Figure 4:
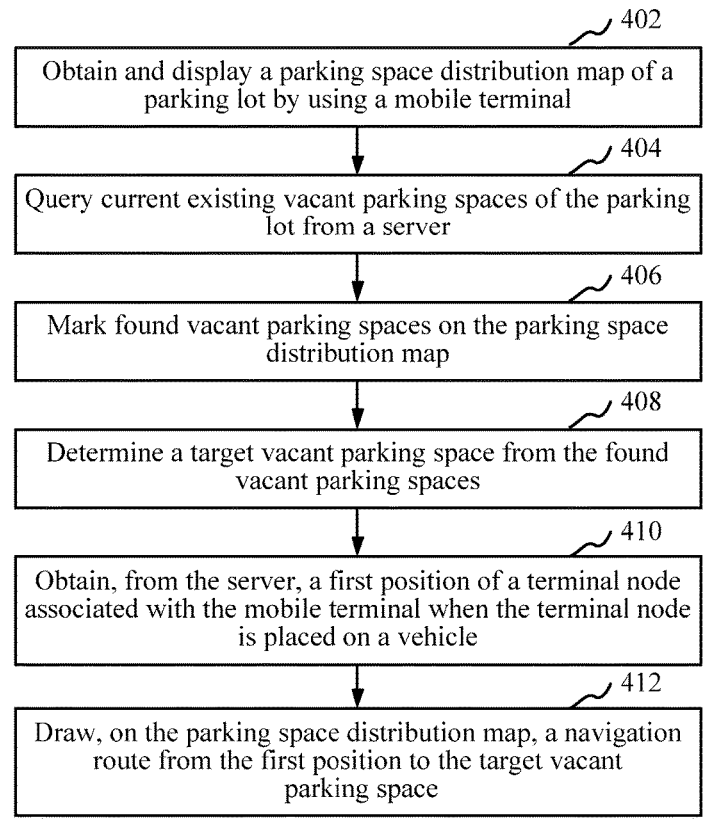
FIG. 4 is a schematic flowchart of a parking space navigation method according to an exemplary embodiment.

As shown in FIG. 4, according to an exemplary embodiment, a parking space navigation method is provided. The exemplary embodiment illustrated in FIG. 4 is described in a situation that the method is applied to the mobile terminal 101 in the parking space navigation system in the foregoing FIG. 1 as an example. The method specifically includes the following steps:

Step 402: Obtain and display a parking space distribution map of a parking lot by using a mobile terminal 101.

A parking lot may be an outdoor parking lot or may be an indoor parking lot, and includes a plurality of parking spaces for parking vehicles. The parking space is usually rectangular, and the area of the parking space is usually greater than or equal to a ground area occupied by a vehicle. The vehicle herein may be an automobile or a manpowered vehicle. The automobile may be an electric automobile or a fuel-powered automobile.

Figure 5:
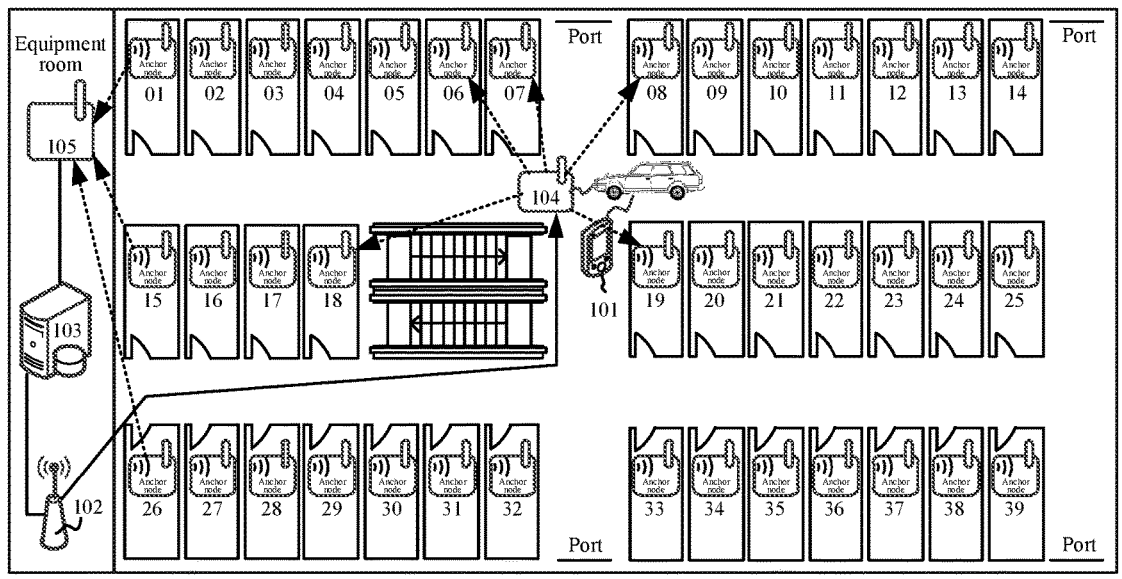
FIG. 5 is a schematic diagram of a parking lot according to an exemplary embodiment.

Referring to a schematic diagram of an example of a parking lot shown in FIG. 5, the parking lot includes parking spaces numbered 01 to 39. The sizes and positions of the parking spaces may be planned according to a form of the parking lot. Anchor nodes 106 may be disposed one-to-one corresponding to the parking spaces. The anchor nodes 106 may include respective corresponding ultrasonic parking space detection modules 107. An equipment room is disposed in the parking lot, and a convergence node 105, a server 103, and a wireless access point 102 may be disposed in the equipment room. However, this is only an example, and the convergence node 105, the server 103, and the wireless access point 102 may each be disposed in different locations, or in other rooms or areas of the parking lot.

Figure 6:
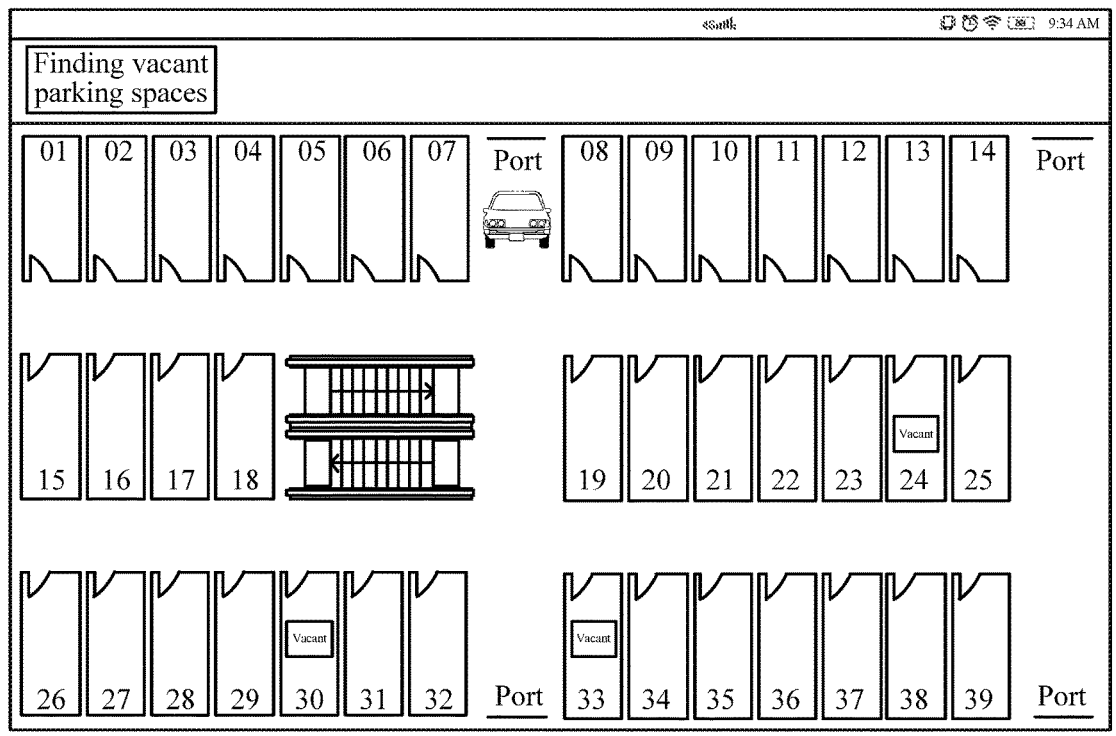
FIG. 6 is a schematic diagram of an interface, on which a parking space distribution map is displayed, of a mobile terminal according to an exemplary embodiment.

A parking space distribution map is a map on which a distribution condition of parking spaces in the parking lot is marked. The size or area of each parking space may also be marked on the parking space distribution map, and positions of ports of the parking lot may also be marked on the parking space distribution map. The ports herein are a collective name of an exit and an entrance. The mobile terminal 101 may locally read the parking space distribution map, or may read the parking space distribution map from the server 103. The mobile terminal 101 may automatically obtain the parking space distribution map from the server 103 when accessing a wireless access point 102 connected to the server 103. An interface, on which the parking space distribution map is displayed, of the mobile terminal 101 is shown in FIG. 6.

Step 404: Query current existing vacant parking spaces of the parking lot from a server 103.

The server 103 maintains states of various parking spaces in the parking space distribution map, and specifically may divide the parking spaces into vacant parking spaces and non-vacant parking spaces. The vacant parking spaces are parking spaces in which vehicles are not parked and may be used for parking vehicles by vehicle owners, and the non-vacant parking spaces are parking spaces that are occupied and cannot be used for parking vehicles by vehicle owners. Specifically, the mobile terminal 101 may send a vacant parking space query request to the server 103, and the server 103 queries current existing vacant parking spaces of the parking lot according to the vacant parking space query request, so as to transmit found vacant parking spaces to the mobile terminal 101. The found vacant parking spaces may be represented by unique identifiers of parking spaces.

According to an exemplary embodiment, the vacant parking spaces found by the mobile terminal 101 are a preset number of vacant parking spaces starting from a vacant parking space ranked first after all the current existing vacant parking spaces are sorted in ascending order of distances between all the current existing vacant parking spaces and the terminal node 104. The current existing vacant parking spaces may be sorted by the server 103. The terminal node 104 is associated with the mobile terminal 101. If the number of all the current existing vacant parking spaces is less than the preset number, the vacant parking spaces found by the mobile terminal 101 may be all the current existing vacant parking spaces.

Step 406: Mark found vacant parking spaces on the parking space distribution map.

Specifically, the mobile terminal 101 marks the found vacant parking spaces on the parking space distribution map, so that the vehicle owner may intuitively learn positions of the found vacant parking spaces for selection of a user as a vacant parking space for parking the vehicle of the user. During marking, a pattern and/or text representing a vacant parking space may be marked on a position, corresponding to the parking space distribution map, of a found vacant parking space. A color may be filled in the pattern.

The mobile terminal 101 may mark the vacant parking spaces in the parking space distribution map by using text "vacant" or rectangles filled with red. For example, referring to FIG. 6, the mobile terminal 101 may mark text "vacant" on parking spaces numbered 24, 30, and 33 in the parking space distribution map, to indicate that the several parking spaces are vacant parking spaces. Alternatively, in some exemplary embodiments, the mobile terminal 101 may mark the vacant parking spaces red instead of or in addition to marking the text "vacant" on the parking spaces.

Step 408: Determine a target vacant parking space from the found vacant parking spaces.

Specifically, the mobile terminal 101 may obtain a vacant parking space selection command, so as to determine, according to the vacant parking space selection command, a target vacant parking space from the vacant parking spaces marked in the parking space distribution map. The vacant parking space selection instruction may be triggered by a touch operation, a physical key clicking operation, or a sound control manner for the mobile terminal 101.

Figure 7:
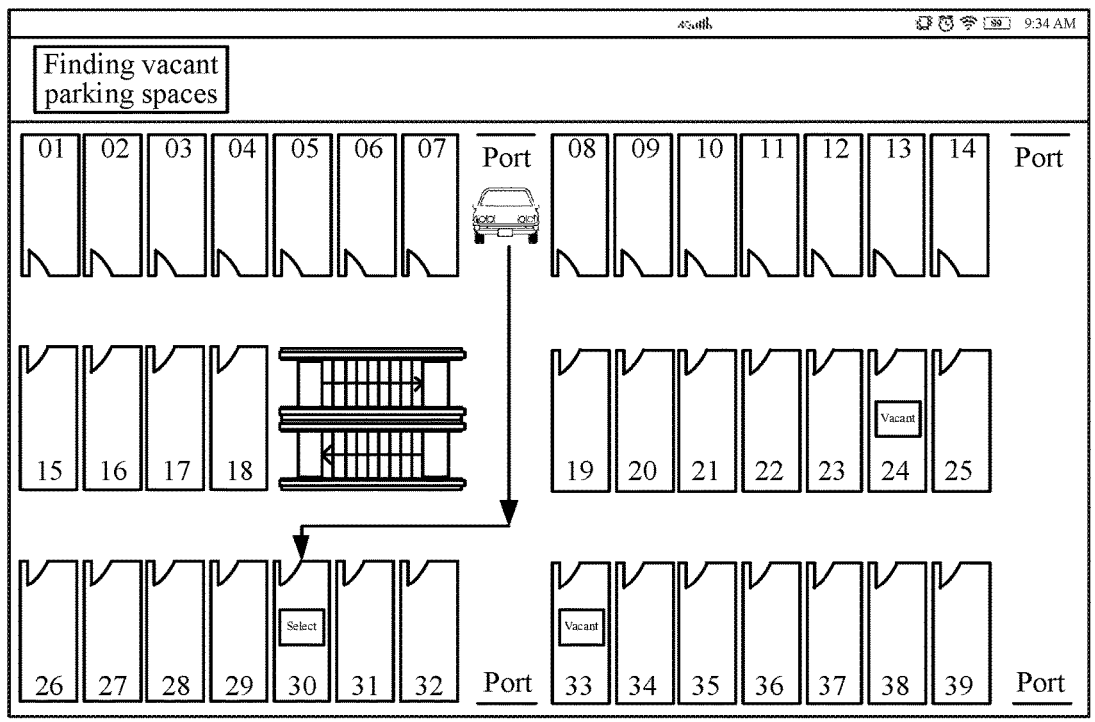
FIG. 7 is a schematic diagram of an interface showing that a target vacant parking space is marked on a parking space distribution map according to an exemplary embodiment.

For example, referring to FIG. 7, the vehicle owner may select and click any one of three vacant parking spaces marked in the parking space distribution map displayed by the mobile terminal 101, so as to display and mark, on the parking space distribution map, the selected target vacant parking space. For example, in FIG. 7, the vacant parking space numbered 30 is selected, and is marked as the target vacant parking space.

According to an exemplary embodiment, the mobile terminal 101 may automatically determine the target vacant parking space from the found vacant parking spaces. For example, the mobile terminal 101 may randomly select a vacant parking space as the target vacant parking space, select a vacant parking space closest to the terminal node 104 as the target vacant parking space, or select a vacant parking space closest to an exit or an entrance as the target vacant parking space.

Step 410: Obtain, from the server 103, a first position of a terminal node 104 associated with the mobile terminal 101 when the terminal node 104 is placed on a vehicle.

Specifically, the vehicle owner may take the terminal node 104 at the entrance of the parking lot, establish an association between the terminal node 104 and the mobile terminal 101 on the server 103, and carry the terminal node 104 or place the terminal node 104 on the vehicle. In this case, the vehicle owner is also located at the vehicle, and the terminal node 104 carried by the vehicle owner is also placed on the vehicle. A first position of the terminal node 104 associated with the mobile terminal 101 when the terminal node 104 is placed on the vehicle represents a position where the vehicle is located.

The terminal node 104 may report, in real time, a position of the terminal node 104 to the server 103, or report positioning information of the terminal node 104, so that the server 103 positions the terminal node 104 according to the positioning information reported by the terminal node 104. The server 103 may push, in real time, the first position of the terminal node 104 to the mobile terminal 101, so that the mobile terminal 101 obtains the real-time first position of the terminal node 104.

Step 412: Draw, on the parking space distribution map, a navigation route from the first position to the target vacant parking space.

Specifically, a navigation route is a line used to guide a user to advance towards a destination on a map, and may be represented by a straight line segment, a folded line segment, or a curved line segment with an arrow. The arrow may alternatively be replaced with another pattern having a direction indication function, for example, a human hand shape with four bent fingers and one straightened finger or a heart shape. The navigation route may be drawn by sequentially connecting a limited number of sequential key dots. The limited number of sequential key dots may be calculated in real time according to the first position, a position of the target vacant parking space, and road distribution in the parking lot.

For example, referring to FIG. 7, the mobile terminal 101 may represent the first position by using a shape of an automobile, mark the first position on the parking space distribution map, and display a folded line segment with an arrow pointing to the target vacant parking space from the first position. The folded line segment with an arrow represents the navigation route from the first position to the target vacant parking space.

According to the foregoing parking space navigation method, after taking a terminal node 104, a vehicle owner associates the terminal node 104 with a mobile terminal 101 and places the terminal node 104 on a vehicle, so that a server 103 may obtain a first position of the terminal node 104 as a position where the vehicle is located. The mobile terminal 101 may obtain a parking space distribution map and vacant parking spaces of a parking lot, and mark the vacant parking spaces on the parking space distribution map, so that the vehicle owner may intuitively learn the current existing vacant sparking spaces of the parking lot. After determining a target vacant parking space, the mobile terminal 101 displays a navigation route from the first position to the target vacant parking space, so that the vehicle owner may directly drive to the target vacant parking space according to the navigation route when driving the vehicle, so as to improve the efficiency of finding vacant parking spaces in the parking lot, and improve the automatic management level of the parking lot.

According to an exemplary embodiment, the parking space navigation method further includes: scanning a graphic code of the terminal node 104 by using the mobile terminal 101 to obtain an identifier of the terminal node 104; and uploading the identifier of the terminal node 104 and an identifier of the mobile terminal 101 to the server to establish an association.

The graphic code is a pattern obtained by coding a specific character or character string, and may be a two-dimensional code as depicted in the example shown in FIG. 1, a bar code, or the like. The bar code is a graphic identifier that is obtained by arranging, according to a coding rule, a plurality of black bars and white bars with different widths and is used to express a group of information. A common bar code is a parallel line pattern formed by arranging white bars (briefly referred to as bars) and white bars (briefly referred to as empties) with greatly different reflectivities. In addition, the two-dimensional code is a bar code obtained by distributing a specific geometry in a planar two-dimensional direction according to a law to form a black and white pattern for recording data symbol information. Two-dimensional codes may be divided into stacked/row arrangement type and matrix type two-dimensional codes. A coding principle of the stacked/row arrangement type two-dimensional codes is established based on one-dimensional bar codes, and bar codes are stacked into two or more rows according to requirements. Representative two-dimensional codes are Code 16K, Code 49, PDF 417, and the like. The matrix type two-dimensional codes are coded in a rectangular space by means of different distributions of black and white pixels in a matrix. At corresponding element positions of the matrix, occurrence of a dot (a square dot, a round dot, or a dot of another shape) is used to represent binary "1", non-occurrence of a dot represents binary "0"; permutations and combinations of dots determine meanings represented by matrix type two-dimensional codes. Representative matrix type two-dimensional codes are: Code One, MaxiCode, QR Code, and the like.

The graphic code of the terminal node 104 may be printed on a housing of the terminal node 104, may be attached on the terminal node 104, or may be displayed by using a display screen when the terminal node 104 has the display screen. The graphic code includes the identifier of the corresponding terminal node 104 to uniquely identify the corresponding terminal node 104. The identifier of the mobile terminal 101 is used to uniquely identify the corresponding mobile terminal 101, and a user account currently logged by the mobile terminal 101 or a sequence number of the mobile terminal 101 may be used as the identifier of the mobile terminal 101. The mobile terminal 101 uploads the identifier of the terminal node 104 and the identifier of the mobile terminal 101 to the server, so that the server establishes an association between the identifier of the terminal node 104 and the identifier of the mobile terminal 101. The association represents an association between the corresponding terminal node 104 and the corresponding mobile terminal 101.

In an exemplary embodiment using a graphic code, a mobile terminal 101 may quickly establish an association with a terminal node 104 by scanning the graphic code, so that a server may push a first position of the terminal node 104 to the mobile terminal 101 according to the association. In this way, after taking the terminal node 104, a vehicle owner may conveniently bind the terminal node 104 with the mobile terminal 101, so as to conveniently obtain a position of a vehicle and a navigation route from the position of the vehicle to a target vacant parking space by using the mobile terminal 101, thereby improving operation convenience.

According to an exemplary embodiment, the mobile terminal 101 may access the server 103 according to an access address after obtaining, by scanning the graphic code, the access address of the server 103. According to an exemplary embodiment, the mobile terminal 101 may receive the parking space distribution map and the first position of the terminal node 104 that are pushed by the server 103 after uploading the identifier of the terminal node 104 and the identifier of the mobile terminal 101 or accessing the server 103 according to the access address.

Figure 8:
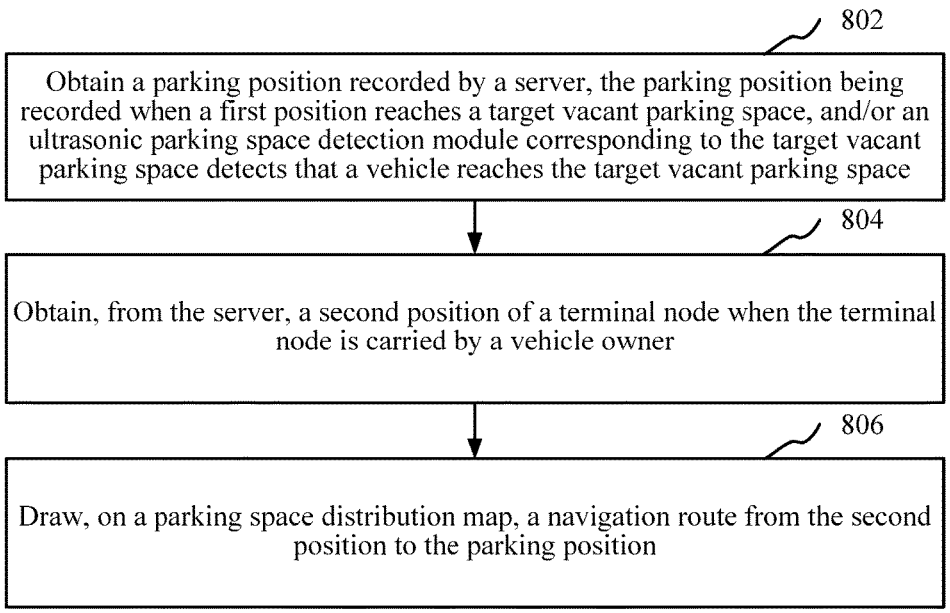
FIG. 8 is a schematic flowchart illustrating a vehicle finding navigation according to an exemplary embodiment.

As shown in FIG. 8, according to an exemplary embodiment, after step 412 shown in FIG. 4, steps of vehicle finding navigation may be further included, and in an exemplary embodiment, the following steps are specifically included:

Step 802: Obtain a parking position recorded by the server 103, the parking position being recorded when the first position reaches the target vacant parking space, and/or an ultrasonic parking space detection module 107 corresponding to the target vacant parking space detects that the vehicle reaches the target vacant parking space.

Specifically, the server 103 obtains the real-time first position of the terminal node 104. When the first position reaches an area represented by the target vacant parking space, the first position indicates that the vehicle of the vehicle owner has reached the target vacant parking space. In this case, the first position or the position of the target vacant parking space may be recorded as a parking position. The target vacant parking space may be changed as a non-vacant parking space when the first position reaches the target vacant parking space, or may be changed as a non-vacant parking space when the target vacant parking space is determined as the target vacant parking space.

Figure 9:
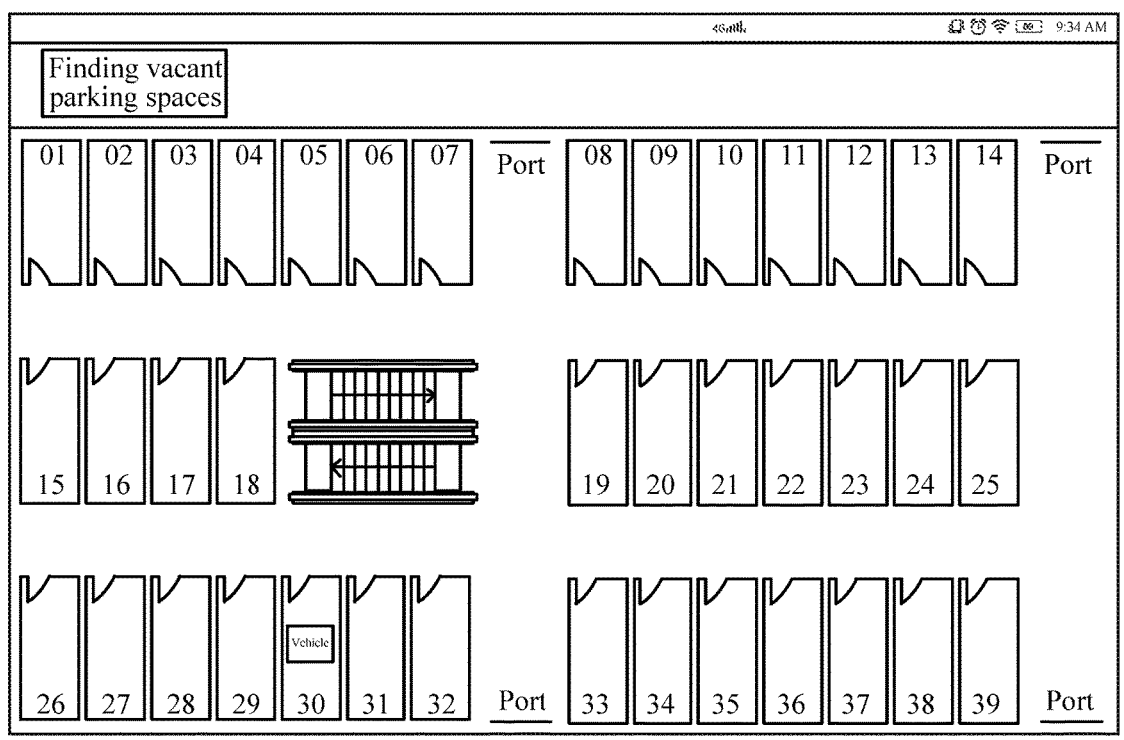
FIG. 9 is a schematic diagram of an interface showing that a parking position is marked on a parking space distribution map according to an exemplary embodiment.

The step of obtaining the parking position recorded by the server 103 may independently exist after step 412 without performing subsequent steps 804 and 806, and the mobile terminal 101 may mark the parking position on the parking space distribution map after obtaining the parking position. For example, as shown in FIG. 9, the parking space numbered 30 is marked as the parking position.

According to an exemplary embodiment, the parking position is recorded when the first position reaches the target vacant parking space, and/or an ultrasonic parking space detection module 107 corresponding to the target vacant parking space detects that the vehicle reaches the target vacant parking space.

The ultrasonic parking space detection module 107 is a module that sends and receives ultrasonic waves to perform ranging, and detects, according to a change of a ranging result, whether a vehicle exists in a corresponding parking space. When detecting that the vehicle reaches the target vacant parking space, the ultrasonic parking space detection module 107 corresponding to the target vacant parking space reports that the vehicle has reached the target vacant parking space to the server 103 by using connected anchor nodes 106. When determining that the first position reaches the target vacant parking space, and detecting that the vehicle reaches the target vacant parking space, the server 103 records the parking position. In some exemplary embodiments, the first position of the terminal node 104 is combined with ultrasonic detection to determine whether the vehicle reaches the target vacant parking space. Because the result of detecting whether the vehicle reaches the target vacant parking space by the ultrasonic parking space detection module 107 by means of ultrasonic ranging is more reliable, the parking position may still be accurately recorded when positioning of the first position is inaccurate, and this exemplary embodiment is particularly applicable to a scenario of an indoor parking lot.

According to an exemplary embodiment, the parking position is recorded when the ultrasonic parking space detection module 107 corresponding to the target vacant parking space detects that the vehicle reaches the target vacant parking space. In this way, accurate recording of the parking position may also be ensured, and this exemplary embodiment is applicable to a scenario of an indoor parking lot.

Step 804: Obtain, from the server 103, a second position of the terminal node 104 when the terminal node 104 is carried by a vehicle owner.

Specifically, after parking the vehicle in the target vacant parking space, the vehicle owner leaves the vehicle, for example, goes shopping or goes to work, and in this case, the vehicle owner carries the terminal node 104. A second position of the terminal node 104 when the terminal node 104 is carried by the vehicle owner represents a position of the vehicle owner.

The terminal node 104 may report, in real time, a position of the terminal node 104 to the server 103, or report positioning information of the terminal node 104, so that the server positions the terminal node 104 according to the positioning information reported by the terminal node 104. The server 103 may push, in real time, the second position of the terminal node 104 to the mobile terminal 101, so that the mobile terminal 101 obtains the real-time second position of the terminal node 104.

Step 806: Draw, on the parking space distribution map, a navigation route from the second position to the parking position.

A navigation route may be represented by a straight line segment, a folded line segment, or a curved line segment with an arrow. The arrow may alternatively be replaced with another pattern having a direction indication function, for example, a human hand shape with four bent fingers and one straightened finger or a heart shape. The navigation route may be drawn by sequentially connecting a limited number of sequential key dots. The limited number of sequential key dots may be calculated in real time according to the first position, a position of the target vacant parking space, and road distribution in the parking lot.

Figure 10:
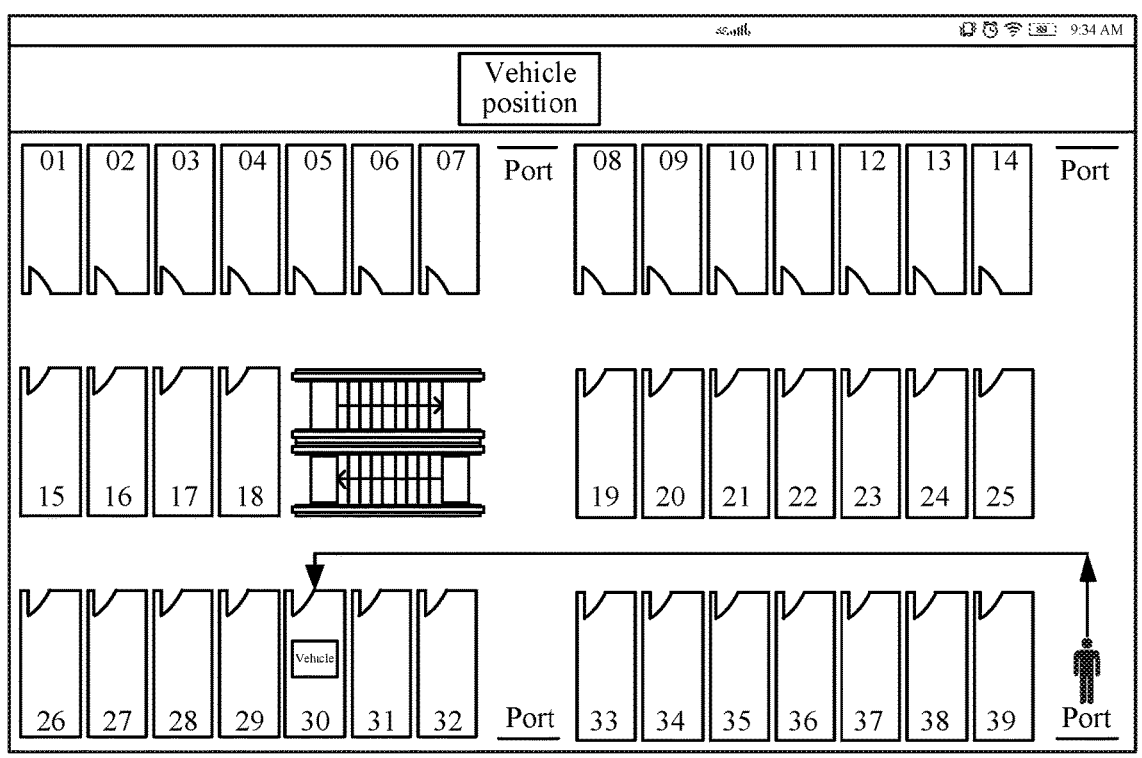
FIG. 10 is a schematic diagram of an interface showing that a navigation route from a second position to a parking position is drawn on a parking space distribution map according to an exemplary embodiment.

For example, referring to FIG. 10, the mobile terminal 101 represents the second position by using a shape of a human body, marks the second position on the parking space distribution map, and displays a folded line segment with an arrow pointing to the parking position from the second position. The folded line segment with an arrow represents the navigation route from the second position to the parking position.

In the exemplary embodiment shown in FIG. 10, when the vehicle owner gets back to the parking lot and wants to take the vehicle, the vehicle owner may intuitively learn the position where he/she is located and the position of the vehicle from the mobile terminal 101. In addition, the vehicle owner may directly advance towards the parking position according to the navigation route provided by the mobile terminal 101, so as to prevent cases in which the vehicle owner cannot find the vehicle due to that the vehicle owner forgets the parking position or enters the parking lot from a port different from a port, through which the vehicle owner leaves the parking lot, thereby improving the vehicle finding efficiency.

According to an exemplary embodiment, interaction with the server 103 is performed by a browser that runs on the mobile terminal 101. Specifically, a series of interactions between the mobile terminal 101 and the server 103 such as scanning the graphic code, querying the vacant parking spaces, obtaining the first position, and obtaining the second position are performed by the browser that runs on the mobile terminal 101. In this way, the mobile terminal 101 does not need to install another third-party application, thereby saving network access traffic needed by downloading the third-party application. In addition, by means of a browser/server (B/S) interaction mode, the server is responsible for data storage and processing, and the browser is responsible for data input and display, and the requirement for hardware configuration of the mobile terminal 101 is relatively low, and the adaptability is strong.

According to an exemplary embodiment, the first position is obtained by calculation according to positioning information, provided by at least three anchor nodes 106 fixed in the parking lot, of the terminal node 104, and the positioning information of the terminal node 104 is generated by the at least three anchor nodes 106 according to a received wireless signal broadcast by the terminal node 104.

Specifically, the positions of the at least three anchor nodes 106 fixed in the parking lots are known, and coordinates of the first position may be calculated according to the positioning information, provided by the at least three anchor nodes 106, of the terminal node 104, and coordinates of the corresponding at least three anchor nodes 106.

The positioning information of the terminal node 104 is information used to determine a position of the terminal node 104. Content of the positioning information may be determined according to an algorithm used for positioning the terminal node 104. The positioning information of the terminal node 104 may be a difference between time when the terminal node 104 broadcasts the signal and time when the anchor nodes 106 receive the broadcast wireless signal. In this case, the server 103 may estimate a distance between the corresponding anchor nodes 106 and the terminal node 104 according to the time difference and a transmission speed of the wireless signal, so as to calculate the first position by using a trilateral positioning algorithm according to the estimated distance and the coordinates of the corresponding anchor nodes 106.

According to an exemplary embodiment, the positioning information of the terminal node 104 includes an RSSI of the received wireless signal broadcast by the terminal node 104 (the RSSI is used to determine link quality, and whether to increase a broadcast sending strength). The RSSI attenuates with an increase of distance. In this case, the server may calculate ranging data according to the RSSI. The ranging data represents a distance between the corresponding anchor nodes 106 and the terminal node 104. The server 103 may obtain the first position by calculation by using the trilateral positioning algorithm according to the calculated data and the coordinates of the corresponding anchor nodes 106.

The relationship between the RSSI and the ranging data may be represented by a formula RSSI=A−10 nlgd, where d is data of the distance between the anchor nodes 106 that receive the wireless signal and the terminal node 104 that broadcasts the wireless signal, A is received power of the wireless signal at 1 meter from a transmission source of the wireless signal, and n is a path loss index, and 1 g is a value related to the environment. In this way, when the RSSI is measured, the ranging data representing the distance between the anchor nodes 106 and the terminal node 104 may be calculated.

In a two-dimensional coordinate system, if coordinates of three known points are known and distances between the known points and an unknown point are known, coordinates of the unknown point may be uniquely determined, and this is a basis of the trilateral positioning algorithm. An algorithm of calculating coordinates of an unknown point by using a calculation formula of distances between coordinates in a two-dimensional coordinate system is the trilateral positioning algorithm. The distances between the three known points and the unknown point herein are three laterals of the trilateral positioning algorithm. Therefore, as long as the ranging data of the three anchor nodes 106 and the terminal node 104 is known, the first position of the terminal node 104 may be estimated.

When the number of the anchor nodes 106 that receive the wireless signal broadcast by the terminal node 104 is greater than three, ranging data of three anchor nodes 106 may be selected therein each time to calculate the position of the terminal node 104 by using the trilateral positioning algorithm, and the calculated positions are averaged into an average value as the final first position.

According to an exemplary embodiment, the anchor nodes 106 may first calculate the ranging data according to the RSSI of the received wireless signal broadcast by the terminal node 104; when the ranging data is less than or equal to a threshold value, the positioning information including the calculated ranging data and/or the RSSI is reported to the server 103; when the ranging data is greater than the threshold value, the positioning information is not reported. The threshold value may be preset or may be set experimentally. Because the attribute of the RSSI that the RSSI attenuates with an increase of distance sharply weakens when the distance is excessively long, the positioning information is reported only when the ranging data is less than or equal to the threshold value, thereby improving the positioning accuracy. The threshold value may be 8 meters to 12 meters, preferably, 10 meters.

According to an exemplary embodiment, the positioning information of the terminal node 104 includes an RSSI of the received wireless signal broadcast by the terminal node 104, and the first position is obtained by calculation by the server 103 according to optimized ranging data and coordinates of the corresponding anchor nodes 106 by using a trilateral positioning algorithm after the server optimizes the RSSI by using a Gaussian model to obtain an optimized RSSI and calculates the optimized ranging data.

Specifically, there may be N values of the RSSI of the wireless signal that is broadcast by the terminal node 104 and received by the anchor nodes 106, and there is a low probability that the RSSI has a large deviation due to large interference. RSSIs of high-probability occurrence intervals are obtained by using a Gaussian model, and then the RSSIs are averaged to obtain an optimized RSSI, and optimized ranging data is calculated according to the optimized RSSI. Then the first position may be calculated by using the trilateral positioning algorithm according to the optimized ranging data and the coordinates of the corresponding anchor nodes 106. A high-probability occurrence interval may be [0.6, 1].

In an exemplary embodiment, optimization is performed by using a Gaussian model, so as to reduce the impact of some low probability and/or large interference events on the overall measurement, thereby enhancing the accuracy of positioning of the terminal node 104.

Figure 11:
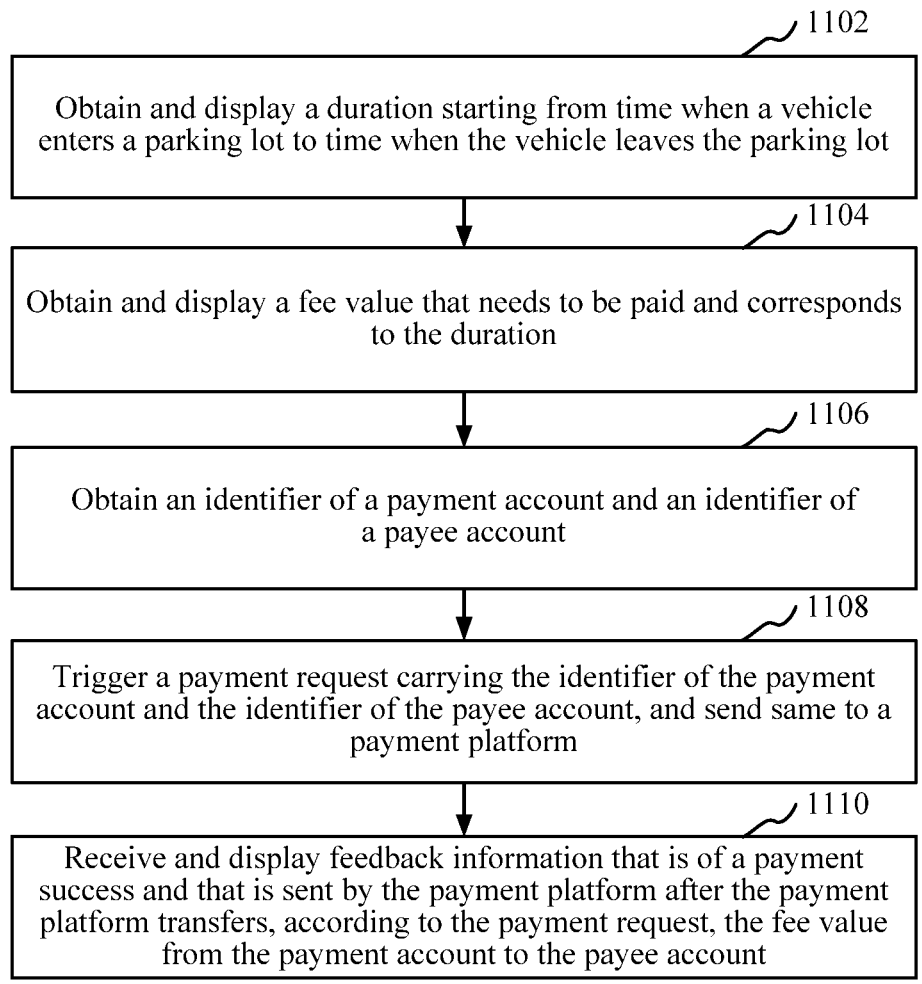
FIG. 11 is a schematic flowchart of a fee payment process according to an exemplary embodiment.

As shown in FIG. 11, according to an exemplary embodiment, the parking space navigation method may further include steps of fee payment, and specifically may include the following:

Step 1102: Obtain and display a duration starting from a time when a vehicle enters a parking lot to a time when the vehicle leaves the parking lot.

Specifically, a duration starting from a time when a vehicle enters a parking lot to a time when the vehicle leaves the parking lot is a difference that may be obtained by calculation by subtracting a first time point recorded when the vehicle enters the parking lot from a second time point recorded when the vehicle leaves the parking lot, and the first time point and the second time point may be obtained from a server. The server may be the server 103, or may be an external server. By way of illustration and ease of description only, the server is hereinafter described with reference to the server 103. The first time point may be recorded by a mobile terminal 101 or the server 103 when the mobile terminal 101 uploads an identifier of the mobile terminal 101 and an identifier of a terminal node 104, or may be recorded by a timing apparatus dedicatedly disposed at a port of the parking lot, and reported to the server 103. The second time point may be recorded by the timing apparatus dedicatedly disposed at the port of the parking lot, and reported to the server 103, or may be recorded by the server 103 when the second position reaches the port of the parking lot.

Step 1104: Obtain and display a fee value that needs to be paid and corresponds to the duration.

The relationship between the fee value and the duration may be preset, and a fee value to be paid may be calculated according to the relationship. For example, a first amount may be paid for the part, within 1 hour, of the duration, and a second amount may be paid for each hour beyond 1 hour. In some exemplary embodiments, the second amount may be less than the first amount.

Step 1106: Obtain an identifier of a payment account and an identifier of a payee account.

A payment account may be a credit card account, a debit card account, or a third-party payment account, and a payee account may also be a credit card account, a debit card account, or a third-party payment account. An account name or a card number of a corresponding account may be used as an identifier of the payment account and an identifier of the payee account. The identifier of the payment account may be entered by a user or selected from existing options, and the identifier of the payee account may be obtained from the server 103.

Step 1108: Trigger a payment request carrying the identifier of the payment account and the identifier of the payee account, and send the payment request to a payment platform.

Specifically, the mobile terminal 101 may automatically generate a payment request including the identifier of the payment account and the identifier of the payee account, and send the payment request to a payment platform. The mobile terminal 101 may alternatively generate a two-dimensional code according to the identifier of the payment account, the identifier of the payee account, and the fee value, and display same, and scan the two-dimensional code by using a handheld scanning terminal to generate, by using the handheld scanning terminal, a payment request carrying the identifier of the payment account and the identifier of the payee account and send the payment request to the payment platform.

Step 1110: Receive and display feedback information that is of a payment success and that is sent by the payment platform after the payment platform transfers, according to the payment request, the fee value from the payment account to the payee account.

Specifically, the payment platform completes payment after transferring the fee value from the payment account to the payee account, and returns feedback information representing a payment success to the mobile terminal 101. The mobile terminal 101 displays the feedback information to prompt the user that payment is completed.

Figure 12:
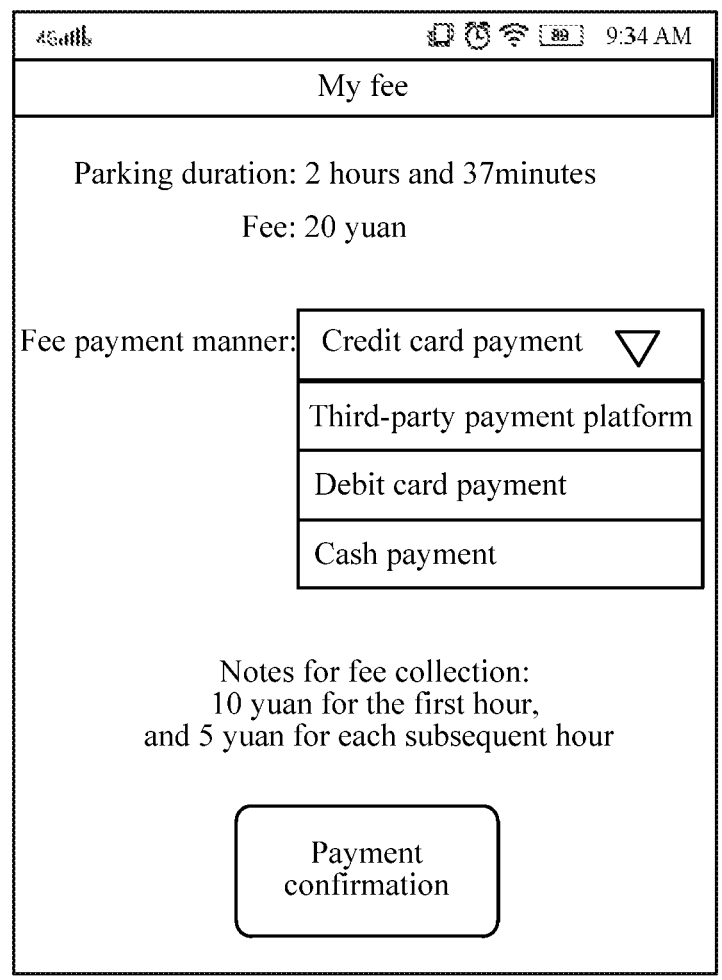
FIG. 12 is a schematic diagram of a fee payment page displayed in a mobile terminal according to an exemplary embodiment.

For example, the mobile terminal 101 may display a fee payment page shown in FIG. 12 to display information such as a parking duration, a fee value to be paid, a payment manner, and notes for fee collection. The user clicks a button of payment confirmation to trigger the payment request and sends the payment request to the payment platform.

In the exemplary embodiment shown in FIGS. 11 and 12, a vehicle owner may quickly and conveniently pay fees to be paid for vehicle parking by using a mobile terminal 101, thereby improving operation convenience.

Figure 13:
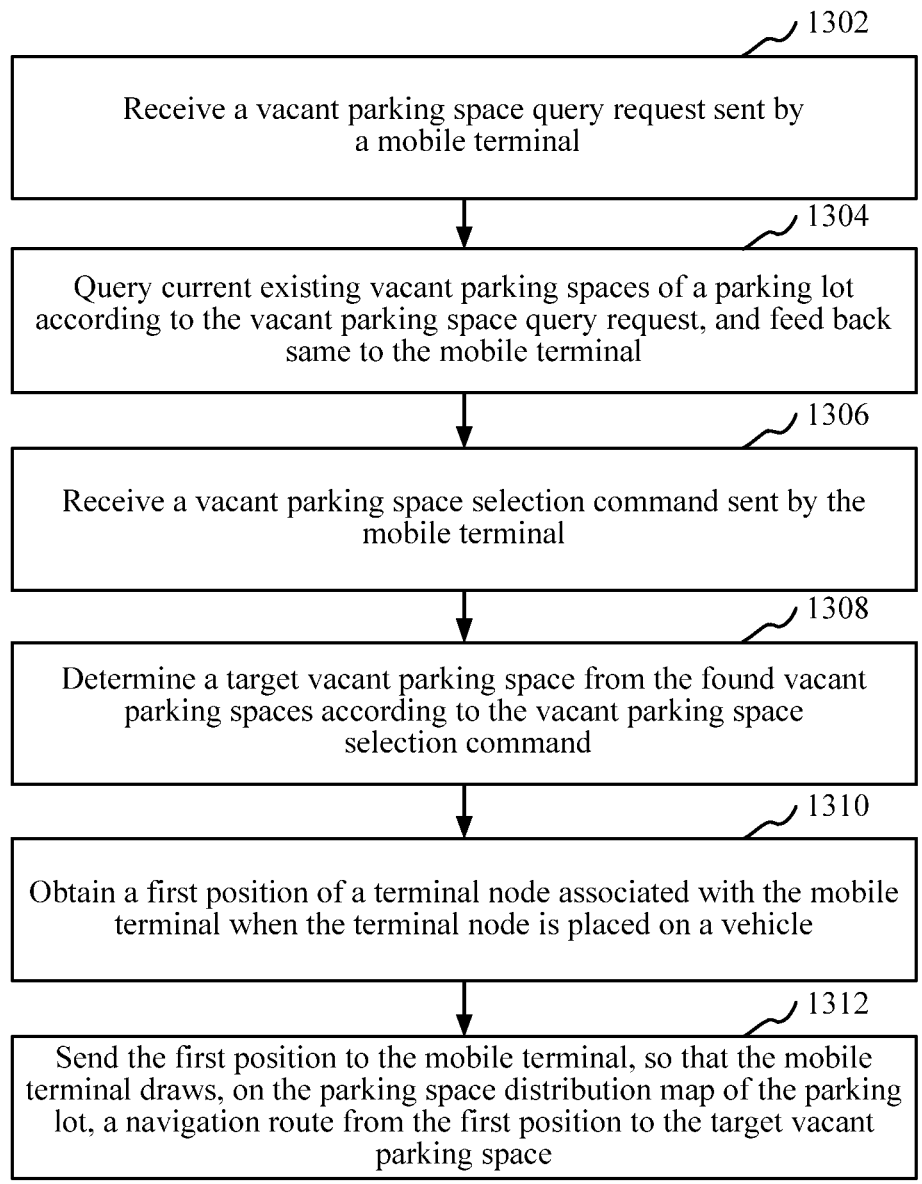
FIG. 13 is a schematic flowchart of a parking space management method according to an exemplary embodiment.

As shown in FIG. 13, according to an exemplary embodiment, a parking space management method is provided. The exemplary embodiment shown in FIG. 13 is described by using that the method is applied to the server 103 in the foregoing FIG. 1 as an example. The method specifically includes the following:

Step 1302: Receive a vacant parking space query request sent by a mobile terminal 101.

Specifically, the server 103 maintains states of various parking spaces in the parking space distribution map, and specifically may divide the parking spaces into vacant parking spaces and non-vacant parking spaces. The vacant parking spaces are parking spaces in which vehicles are not parked and may be used for parking vehicles by vehicle owners, and the non-vacant parking spaces are parking spaces that are occupied and cannot be used for parking vehicles by vehicle owners.

Step 1304: Query current existing vacant parking spaces of a parking lot according to the vacant parking space query request, and transmit the vacant parking spaces to the mobile terminal 101.

Specifically, the mobile terminal 101 may send a vacant parking space query request to the server 103, and the server queries current existing vacant parking spaces of the parking lot according to the vacant parking space query request, so as to transmit found vacant parking spaces to the mobile terminal 101. The found vacant parking spaces may be represented by unique identifiers of parking spaces.

According to an exemplary embodiment, the vacant parking spaces found by the mobile terminal 101 are a threshold number of vacant parking spaces starting from a vacant parking space ranked first after all the current existing vacant parking spaces of the server 103 are sorted in ascending order of distances between all the current vacant parking spaces and the terminal node 104. The threshold number may be preset. The terminal node 104 is associated with the mobile terminal 101. If the number of all the current existing vacant parking spaces of the server 103 is less than the threshold number, the vacant parking spaces found by the mobile terminal 101 may be all the current existing vacant parking spaces of the server 103.

The mobile terminal 101 marks the found vacant parking spaces on the parking space distribution map. Specifically, the mobile terminal 101 marks the found vacant parking spaces on the parking space distribution map, so that the vehicle owner may intuitively learn positions of the found vacant parking spaces for selection of a user as a vacant parking space for parking the vehicle of the user. During marking, a pattern and/or text representing a vacant parking space may be marked on a position, corresponding to the parking space distribution map, of a found vacant parking space. A color may be filled in the pattern.

Step 1306: Receive a vacant parking space selection command sent by the mobile terminal 101.

Specifically, a vacant parking space selection command is used to select a vacant parking space for parking the vehicle of the vehicle owner. The vacant parking space selection command may be triggered by a touch operation, a physical key clicking operation, or a sound control manner for the mobile terminal 101.

Step 1308: Determine a target vacant parking space from the found vacant parking spaces according to the vacant parking space selection command.

Specifically, the server 103 determines a vacant parking space specified by the vacant parking space selection command as the target vacant parking space, and the vacant parking space specified by the vacant parking space selection command belongs to the found vacant parking spaces.

Step 1310: Obtain a first position of a terminal node 104 associated with the mobile terminal 101 when the terminal node 104 is placed on a vehicle.

Specifically, the vehicle owner may take the terminal node 104 at the entrance of the parking lot, establish an association between the terminal node 104 and the mobile terminal 101 on the server 103, and carry the terminal node 104 or place the terminal node 104 on the vehicle. In this case, the vehicle owner is also located on the vehicle, and the terminal node 104 carried by the vehicle owner is also placed on the vehicle. A first position of the terminal node 104 associated with the mobile terminal 101 when the terminal node 104 is placed on the vehicle represents a position where the vehicle is located. The terminal node 104 may report, in real time, a position of the terminal node 104 to the server 103, or report positioning information of the terminal node 104, so that the server 103 positions the terminal node 104 according to the positioning information reported by the terminal node 104.

Step 1312: Send the first position to the mobile terminal 101, so that the mobile terminal 101 draws, on the parking space distribution map of the parking lot, a navigation route from the first position to the target vacant parking space.

The server 103 may push, in real time, the first position of the terminal node 104 to the mobile terminal 101, so that the mobile terminal 101 obtains the real-time first position of the terminal node 104. A navigation route is a line used to guide a user to advance towards a destination on a map, and may be represented by a straight line segment, a folded line segment, or a curved line segment with an arrow. The arrow may alternatively be replaced with another pattern having a direction indication function, for example, a human hand shape with four bent fingers and one straightened finger or a heart shape. The navigation route may be drawn by sequentially connecting a limited number of sequential key dots. The limited number of sequential key dots may be calculated in real time according to the first position, a position of the target vacant parking space, and road distribution in the parking lot.

According to the foregoing parking space management method, after taking a terminal node 104, a vehicle owner associates the terminal node 104 with a mobile terminal 101 and places the terminal node 104 on a vehicle, so that a server 103 may obtain a first position of the terminal node 104 as a position where the vehicle is located. The mobile terminal 101 may obtain a parking space distribution map and vacant parking spaces of a parking lot, and marks the vacant parking spaces on the parking space distribution map, so that the vehicle owner may intuitively learn the current existing vacant sparking spaces of the parking lot. After determining a target vacant parking space, the mobile terminal 101 displays a navigation route from the first position to the target vacant parking space, so that the vehicle owner may directly drive to the target vacant parking space according to the navigation route when driving the vehicle, so as to improve the efficiency of finding the vacant parking spaces in the parking lot, and improve the automatic management level of the parking lot.

According to an exemplary embodiment, the parking space management method may further include receiving an identifier, uploaded by the mobile terminal 101, of the mobile terminal 101, and an identifier, which is obtained by scanning a graphic code of the terminal node 104, of the terminal node 104; and establishing an association between the identifier of the mobile terminal 101 and the identifier of the terminal node 104.

The graphic code of the terminal node 104 may be printed on a housing of the terminal node 104, may be attached on the terminal node 104, or may be displayed by using a display screen when the terminal node 104 has the display screen. The graphic code includes the identifier of the corresponding terminal node 104 to uniquely identify the corresponding terminal node 104. The identifier of the mobile terminal 101 is used to uniquely identify the corresponding mobile terminal 101, and a user account currently logged by the mobile terminal 101 or a sequence number of the mobile terminal 101 may be used as the identifier of the mobile terminal 101. The mobile terminal 101 uploads the identifier of the terminal node 104 and the identifier of the mobile terminal 101 to the server 103, so that the server 103 establishes an association between the identifier of the terminal node 104 and the identifier of the mobile terminal 101. The association represents an association between the corresponding terminal node 104 and the corresponding mobile terminal 101.

In an exemplary embodiment using a graphic code, a mobile terminal 101 may quickly establish an association with a terminal node 104 by scanning a graphic code, so that a server 103 may push a first position of the terminal node 104 to the mobile terminal 101 according to the association. In this way, after taking the terminal node 104, a vehicle owner may conveniently bind the terminal node 104 with the mobile terminal 101, so as to conveniently obtain a position of a vehicle and a navigation route from the position of the vehicle to a target vacant parking space by using the mobile terminal 101, thereby improving operation convenience.

Figure 14:
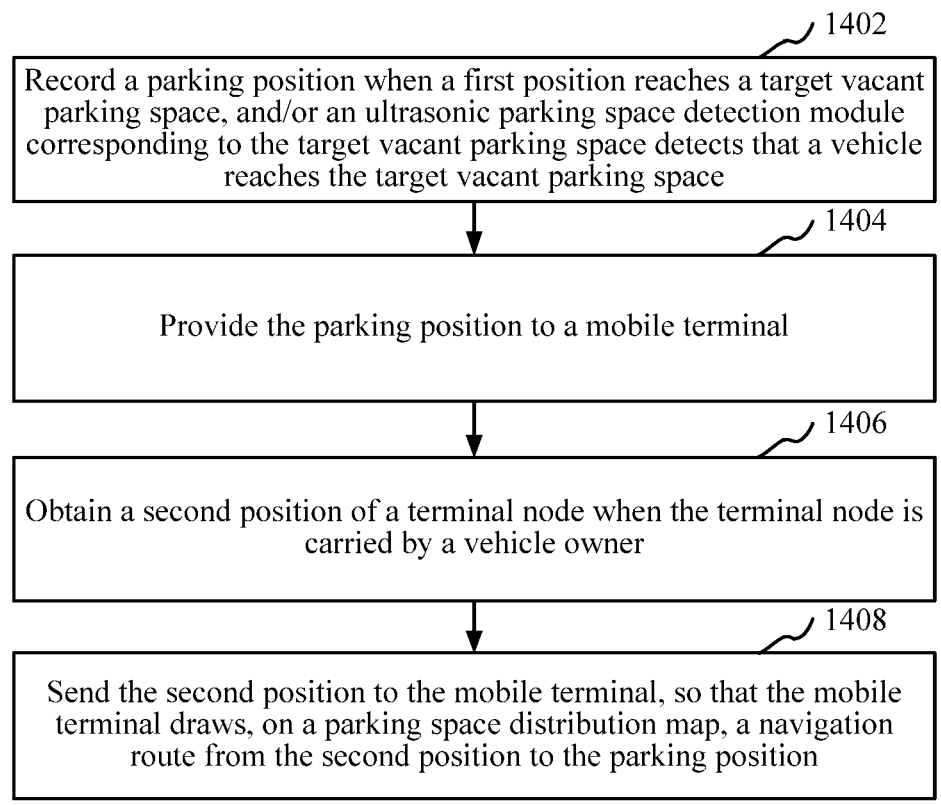
FIG. 14 is a schematic flowchart of providing a vehicle finding navigation route according to an exemplary embodiment.

As shown in FIG. 14, according to an exemplary embodiment, the parking space management method further includes providing a vehicle finding navigation route, and specifically includes the following:

Step 1402: Record a parking position when the first position reaches the target vacant parking space, and/or an ultrasonic parking space detection module 107 corresponding to the target vacant parking space detects that the vehicle reaches the target vacant parking space.

Specifically, the server 103 obtains the real-time first position of the terminal node 104. When the first position reaches an area represented by the target vacant parking space, the first position indicates that the vehicle of the vehicle owner has reached the target vacant parking space. In this case, the first position or the position of the target vacant parking space may be recorded as a parking position. The target vacant parking space may be changed as a non-vacant parking space when the first position reaches the target vacant parking space, or may be changed as a non-vacant parking space when the target vacant parking space is determined as the target vacant parking space. The mobile terminal 101 may mark the parking position on the parking space distribution map after obtaining the parking position.

The ultrasonic parking space detection module 107 is a module that sends and receives ultrasonic waves to perform ranging, and detects, according to a change of a ranging result, whether a vehicle exists in a corresponding parking space. When detecting that the vehicle reaches the target vacant parking space, the ultrasonic parking space detection module 107 corresponding to the target vacant parking space reports it to the server 103 by using connected anchor nodes 106. When determining that the first position reaches the target vacant parking space, and detecting that the vehicle reaches the target vacant parking space, the server 103 records the parking position. In an exemplary embodiment, the first position of the terminal node 104 may be combined with ultrasonic detection to determine whether the vehicle reaches the target vacant parking space. Because the result of detecting whether the vehicle reaches the target vacant parking space by the ultrasonic parking space detection module 107 by means of ultrasonic ranging is more reliable, the parking position may still be accurately recorded when positioning of the first position is inaccurate, and this exemplary embodiment is particularly applicable to a scenario of an indoor parking lot.

According to an exemplary embodiment, the parking position is recorded when the ultrasonic parking space detection module 107 corresponding to the target vacant parking space detects that the vehicle reaches the target vacant parking space. In this way, accurate recording of the parking position may also be ensured, and this exemplary embodiment is applicable to a scenario of an indoor parking lot.

Step 1404: Provide the parking position to the mobile terminal 101.

The server 103 may push the parking position to the mobile terminal 101 after recording the parking position, or may receive a parking position query request sent by the mobile terminal 101, so as to return the parking position to the mobile terminal 101 according to the parking position query request.

Step 1406: Obtain a second position of the terminal node 104 when the terminal node 104 is carried by a vehicle owner.

Specifically, after parking the vehicle in the target vacant parking space, the vehicle owner leaves the vehicle, for example, goes shopping or goes to work, and in this case, the vehicle owner needs to carry the terminal node 104. A second position of the terminal node 104 when the terminal node 104 is carried by the vehicle owner represents a position of the vehicle owner.

The terminal node 104 may report, in real time, a position of the terminal node 104 to the server 103, or report positioning information of the terminal node 104, so that the server 103 positions the terminal node 104 according to the positioning information reported by the terminal node 104. The server 103 may push, in real time, the second position of the terminal node 104 to the mobile terminal 101, so that the mobile terminal 101 obtains the real-time second position of the terminal node 104.

Step 1408: Send the second position to the mobile terminal 101, so that the mobile terminal 101 draws, on the parking space distribution map, a navigation route from the second position to the parking position.

A navigation route may be represented by a straight line segment, a folded line segment, or a curved line segment with an arrow. The arrow may alternatively be replaced with another pattern having a direction indication function, for example, a human hand shape with four bent fingers and one straightened finger or a heart shape. The navigation route may be drawn by sequentially connecting a limited number of sequential key dots. The limited number of sequential key dots may be calculated in real time according to the first position, a position of the target vacant parking space, and road distribution in the parking lot.

In an exemplary embodiment, when the vehicle owner gets back to the parking lot and wants to take the vehicle, the vehicle owner may intuitively learn the position where he/she is located and the position of the vehicle from the mobile terminal 101. In addition, the vehicle owner may directly advance towards the parking position according to the navigation route provided by the mobile terminal 101, so as to prevent cases in which the vehicle owner cannot find the vehicle due to that the vehicle owner forgets the parking position or enters the parking lot from a port different from a port, through which the vehicle owner leaves the parking lot, thereby improving the vehicle finding efficiency.

According to an exemplary embodiment, the server 103 interacts with a browser that runs on the mobile terminal 101. Specifically, a series of interactions between the mobile terminal 101 and the server 103 such as scanning the graphic code, querying the vacant parking spaces, obtaining the first position, and obtaining the second position are performed by the browser that runs on the mobile terminal 101. In this way, the mobile terminal 101 does not need to install another third-party application, thereby saving network access traffic needed by downloading the third-party application. In addition, by means of a B/S interaction mode, the server 103 is responsible for data storage and processing, and the browser is responsible for data input and display, and the requirement for hardware configuration of the mobile terminal 101 is relatively low, and the adaptability is strong.

According to an exemplary embodiment, step 1310 in FIG. 13 may include obtaining positioning information that is of the terminal node 104 associated with the mobile terminal 101 when the terminal node 104 is placed on the vehicle and that is provided by at least three anchor nodes 106 fixed in the parking lot, where the positioning information of the terminal node 104 is generated by the at least three anchor nodes 106 according to a received wireless signal broadcast by the terminal node 104; and obtaining the first position of the terminal node 104 by calculation according to the positioning information of the terminal node 104.

Specifically, the positions of the at least three anchor nodes 106 fixed in the parking lots are known, and coordinates of the first position may be calculated according to the positioning information, provided by the at least three anchor nodes 106, of the terminal node 104, and coordinates of the corresponding at least three anchor nodes 106.

The positioning information of the terminal node 104 is information used to determine a position the terminal node 104. Content of the positioning information may be determined according to an algorithm used for positioning the terminal node 104. The positioning information of the terminal node 104 may be a difference between a time when the terminal node 104 broadcasts the signal and a time when the anchor nodes 106 receive the broadcast wireless signal. In this case, the server 103 may estimate a distance between the corresponding anchor nodes 106 and the terminal node 104 according to the time difference and a transmission speed of the wireless signal, so as to calculate the first position by using a trilateral positioning algorithm according to the estimated distance and the coordinates of the corresponding anchor nodes 106.

According to an exemplary embodiment, the positioning information of the terminal node 104 includes an RSSI of the received wireless signal broadcast by the terminal node 104 (the RSSI is used to determine link quality, and whether to increase a broadcast sending strength). The RSSI attenuates with an increase of distance. In this case, the server 103 may calculate ranging data according to the RSSI. The ranging data represents a distance between the corresponding anchor nodes 106 and the terminal node 104. The server 103 may obtain the first position by calculation by using the trilateral positioning algorithm according to the calculated data and the coordinates of the corresponding anchor nodes 106.

The relationship between the RSSI and the ranging data may be represented by a formula RSSI=A−10 nlgd, where d is data of the distance between the anchor nodes 106 that receive the wireless signal and the terminal node 104 that broadcasts the wireless signal, A is received power of the wireless signal at 1 meter from a transmission source of the wireless signal, and n is a path loss index, and 1 g is a value related to the environment. In this way, when the RSSI is measured, the ranging data representing the distance between the anchor nodes 106 and the terminal node 104 may be calculated.

In a two-dimensional coordinate system, if coordinates of three known points are known and distances between the known points and an unknown point are known, coordinates of the unknown point may be uniquely determined, and this is a basis of the trilateral positioning algorithm. An algorithm of calculating coordinates of an unknown point by using a calculation formula of distances between coordinates in a two-dimensional coordinate system is the trilateral positioning algorithm. The distances between the three known points and the unknown point herein are three laterals of the trilateral positioning algorithm. Therefore, as long as the ranging data of the three anchor nodes 106 and the terminal node 104 is known, the first position of the terminal node 104 may be estimated.

When the number of the anchor nodes 106 that receive the wireless signal broadcast by the terminal node 104 is greater than three, ranging data of three anchor nodes 106 may be selected therein each time to calculate the position of the terminal node 104 by using the trilateral positioning algorithm, and the calculated positions are averaged into an average value as the final first position.

According to an exemplary embodiment, the anchor nodes 106 may first calculate the ranging data according to the RSSI of the received wireless signal broadcast by the terminal node 104; when the ranging data is less than or equal to a threshold value, the positioning information including the calculated ranging data and/or the RSSI is reported to the server 103; when the ranging data is greater than the threshold value, the positioning information is not reported. The threshold value may be preset. Because the attribute of the RSSI that the RSSI attenuates with an increase of distance sharply weakens when the distance is excessively long, the positioning information is reported only when the ranging data is less than or equal to the threshold value, thereby improving the positioning accuracy. The threshold value may be 8 meters to 12 meters, preferably, 10 meters.

According to an exemplary embodiment, the positioning information of the terminal node 104 includes an RSSI of the received wireless signal broadcast by the terminal node 104, and the step of obtaining the first position of the terminal node 104 by calculation according to the positioning information of the terminal node 104 specifically includes: optimizing the RSSI by using a Gaussian model to obtain an optimized RSSI and calculating optimized ranging data; and obtaining the first position of the terminal node 104 by calculation according to the optimized ranging data and coordinates of the corresponding anchor nodes 106 by using a trilateral positioning algorithm.

Specifically, there may be N values of the RSSI of the wireless signal that is broadcast by the terminal node 104 and received by the anchor nodes 106, and there is a low probability that the RSSI has large deviation due to large interference. RSSIs of high-probability occurrence intervals are obtained by using a Gaussian model, and then the RSSIs are averaged to obtain an optimized RSSI, and optimized ranging data is calculated according to the optimized RSSI. Then the first position may be calculated by using the trilateral positioning algorithm according to the optimized ranging data and the coordinates of the corresponding anchor nodes 106. A high-probability occurrence interval may be [0.6, 1].

In an exemplary embodiment, optimization is performed by using a Gaussian model, so as to reduce the impact of some low probability and/or large interference events on overall measurement, thereby enhancing the accuracy of positioning of the terminal node 104.

Figure 15:
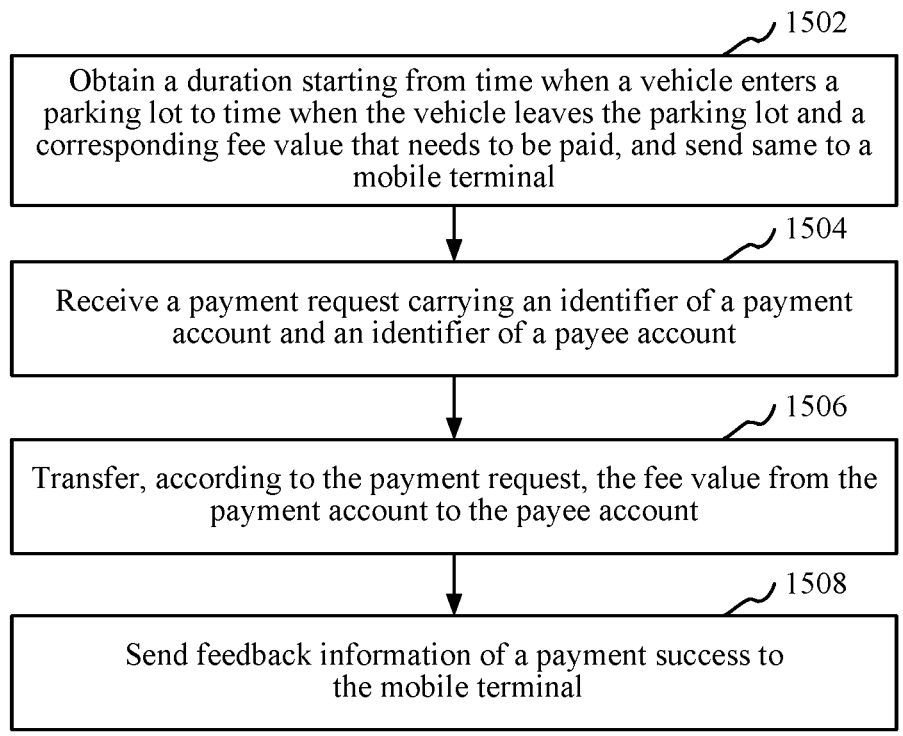
FIG. 15 is a schematic flowchart of a fee payment completion process according to an exemplary embodiment.

As shown in FIG. 15, according to an exemplary embodiment, the parking space management method may further include completing fee payment, and specifically includes the following:

Step 1502: Obtain a duration starting from a time when a vehicle enters a parking lot to a time when the vehicle leaves the parking lot and a corresponding fee value to be paid, and send the fee value to a mobile terminal 101.

Specifically, a duration starting from a time when a vehicle enters a parking lot to a time when the vehicle leaves the parking lot is a difference that may be obtained by calculation by subtracting a first time point recorded when the vehicle enters the parking lot from a second time point recorded when the vehicle leaves the parking lot, and the first time point and the second time point may be obtained from a server 103. The first time point may be recorded by the server 103 when the mobile terminal 101 uploads an identifier of the mobile terminal 101 and an identifier of a terminal node 104, or may be recorded by a timing apparatus dedicatedly disposed at a port of the parking lot, and reported to the server 103. The second time point may be recorded by the timing apparatus dedicatedly disposed at the port of the parking lot, and reported to the server 103, or may be recorded by the server 103 when the second position reaches the port of the parking lot. The relationship between the fee value and the duration may be preset, or may be determined experimentally, and a fee value to be paid may be calculated according to the relationship.

Step 1504: Receive a payment request carrying an identifier of a payment account and an identifier of a payee account.

A payment account may be a credit card account, a debit card account, or a third-party payment account, and a payee account may also be a credit card account, a debit card account, or a third-party payment account. An account name or a card number of a corresponding account may be used as an identifier of the payment account and an identifier of the payee account. The identifier of the payment account may be entered by a user or selected from existing options, and the identifier of the payee account may be obtained from the server 103.

The mobile terminal 101 may automatically generate a payment request carrying the identifier of the payment account and the identifier of the payee account, and send the payment request to a payment platform. The mobile terminal 101 may alternatively generate a two-dimensional code according to the identifier of the payment account, the identifier of the payee account, and the fee value, and display the two-dimensional code, and scan the two-dimensional code by using a handheld scanning terminal to generate, by using the handheld scanning terminal, a payment request carrying the identifier of the payment account and the identifier of the payee account and send the payment request to the payment platform.

Step 1506: Transfer, according to the payment request, the fee value from the payment account to the payee account.

Step 1508: Send feedback information of a payment success to the mobile terminal 101.

Specifically, the payment platform completes payment after transferring the fee value from the payment account to the payee account, and returns feedback information representing a payment success to the mobile terminal 101. The mobile terminal 101 displays the feedback information to prompt the user that payment is completed.

In the exemplary embodiment shown in FIG. 15, a vehicle owner may quickly and conveniently pay fees for vehicle parking by using a mobile terminal 101, thereby improving operation convenience.

Figure 16:
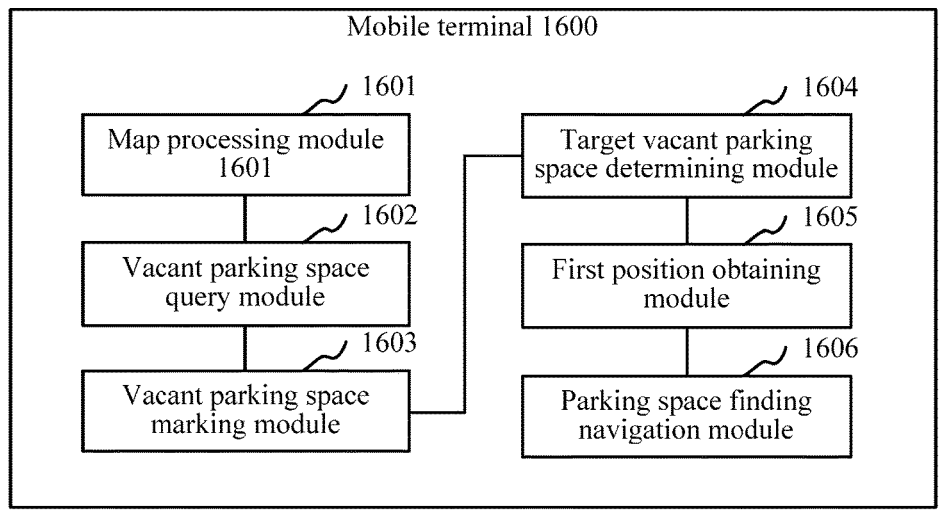
FIG. 16 is a structural block diagram of a mobile terminal according to an exemplary embodiment.

As shown in FIG. 16, according to an exemplary embodiment, a mobile terminal 1600 is provided. The inner structure of the mobile terminal 1600 may correspond to the structure of the mobile terminal 101 shown in FIG. 2. Each of the following modules may be completely or partially implemented by software, hardware, or a combination thereof.

The mobile terminal 1600 includes a map processing module 1601, a vacant parking space query module 1602, a vacant parking space marking module 1603, a target vacant parking space determining module 1604, a first position obtaining module 1605, and a parking space finding navigation module 1606.

The map processing module 1601 is configured to obtain and display a parking space distribution map of a parking lot on display screen of a mobile terminal 1600.

The vacant parking space query module 1602 is configured to query current existing vacant parking spaces of the parking lot from a server 103.

The vacant parking space marking module 1603 is configured to mark found vacant parking spaces on the parking space distribution map.

The target vacant parking space determining module 1604 is configured to determine a target vacant parking space from the found vacant parking spaces.

The first position obtaining module 1605 is configured to obtain, from the server 103, a first position of a terminal node 104 associated with the mobile terminal 1600 when the terminal node 104 is placed on a vehicle.

The parking space finding navigation module 1606 is configured to draw, on the parking space distribution map, a navigation route from the first position to the target vacant parking space.

Figure 17:
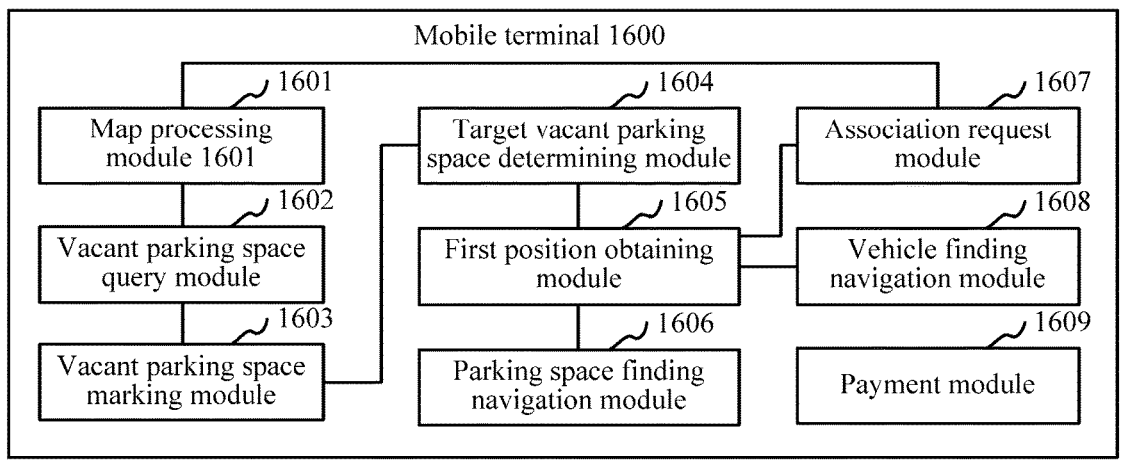
FIG. 17 is a structural block diagram of a mobile terminal according to another exemplary embodiment.

As shown in FIG. 17, according to an exemplary embodiment, the mobile terminal 1600 may further include an association request module 1607, configured to scan a graphic code of the terminal node 104 by using the mobile terminal 101 to obtain an identifier of the terminal node 104; and upload the identifier of the terminal node 104 and an identifier of the mobile terminal 1600 to a server 103 to establish an association.

According to an exemplary embodiment, the mobile terminal 1600 may further include a vehicle finding navigation module 1608, configured to obtain a parking position recorded by the server 103, the parking position being recorded when the first position reaches the target vacant parking space, and/or an ultrasonic parking space detection module 107 corresponding to the target vacant parking space detects that the vehicle reaches the target vacant parking space; obtain, from the server 103, a second position of the terminal node 104 when the terminal node 104 is carried by a vehicle owner; and draw, on the parking space distribution map, a navigation route from the second position to the parking position.

According to an exemplary embodiment, the mobile terminal 1600 may be configured to interact with the server 103 by using a browser that runs on the mobile terminal 101.

According to an exemplary embodiment, the first position is obtained by calculation according to positioning information, provided by at least three anchor nodes 106 fixed in the parking lot, of the terminal node 104, and the positioning information of the terminal node 104 is generated by the at least three anchor nodes 106 according to a received wireless signal broadcast by the terminal node 104.

According to an exemplary embodiment, the positioning information of the terminal node 104 includes an RSSI of the received wireless signal broadcast by the terminal node 104, and the first position is obtained by calculation by the server 103 according to optimized ranging data and coordinates of the corresponding anchor nodes 106 by using a trilateral positioning algorithm after the server 103 optimizes the RSSI by using a Gaussian model to obtain an optimized RSSI and calculates the optimized ranging data.

According to an exemplary embodiment, the mobile terminal 1600 may further include a payment module 1609, configured to obtain and display a duration starting from a time when the vehicle enters the parking lot to a time when the vehicle leaves the parking lot, obtain and display a fee value to be paid and corresponds to the duration, obtain an identifier of a payment account and an identifier of a payee account, trigger a payment request carrying the identifier of the payment account and the identifier of the payee account, and send the payment request to a payment platform, and receive and display feedback information that is of a payment success and that is sent by the payment platform after the payment platform transfers, according to the payment request, the fee value from the payment account to the payee account.

As regards the foregoing mobile terminal 1600, after taking a terminal node 104, a vehicle owner associates the terminal node 104 with a mobile terminal 101 and places the terminal node 104 on a vehicle, so that a server 103 may obtain a first position of the terminal node 104 as a position where the vehicle is located. The mobile terminal 101 may obtain a parking space distribution map and vacant parking spaces of a parking lot, and mark the vacant parking spaces on the parking space distribution map, so that the vehicle owner may intuitively learn the current existing vacant sparking spaces of the parking lot. After determining a target vacant parking space, the mobile terminal 101 displays a navigation route from the first position to the target vacant parking space, so that the vehicle owner may directly drive to the target vacant parking space according to the navigation route when driving the vehicle, so as to improve the efficiency of finding the vacant parking spaces in the parking lot, and improve the automatic management level of the parking lot.

Figure 18:
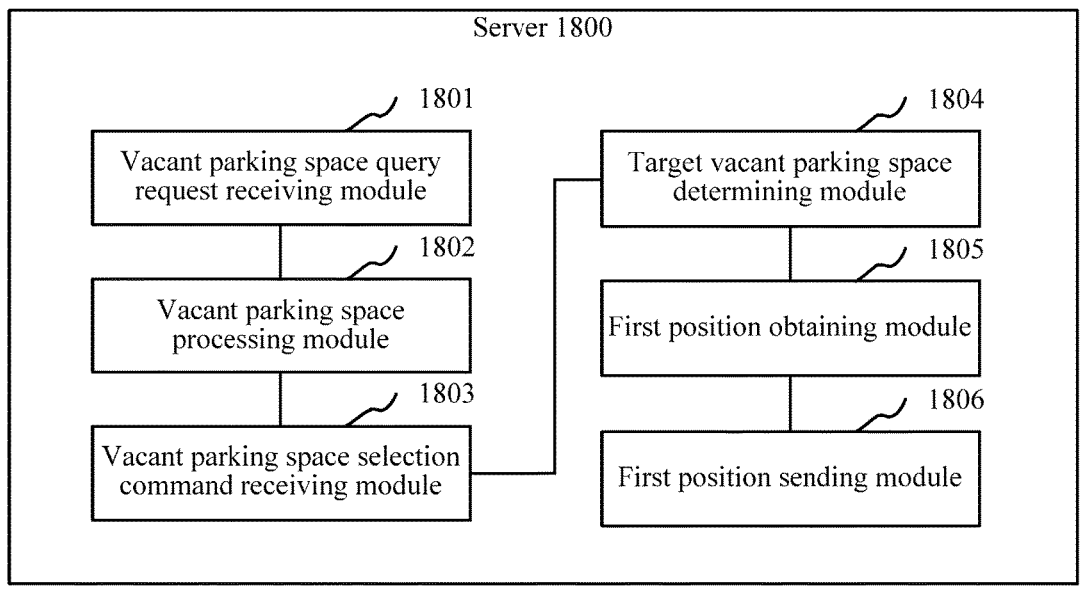
FIG. 18 is a structural block diagram of a server according to an exemplary embodiment.

As shown in FIG. 18, according to an exemplary embodiment, a server 1800 is provided. The inner structure of the server 1800 may correspond to the structure of the server 103 shown in FIG. 3. Each of the following modules may be completely or partially implemented by software, hardware, or a combination thereof.

The server 1800 includes a vacant parking space query request receiving module 1801, a vacant parking space processing module 1802, a vacant parking space selection command receiving module 1803, a target vacant parking space determining module 1804, a first position obtaining module 1805, and a first position sending module 1806.

The vacant parking space query request receiving module 1801 is configured to receive a vacant parking space query request sent by the mobile terminal 101.

The vacant parking space processing module 1802 is configured to query current existing vacant parking spaces of the parking lot according to the vacant parking space query request, and transmit the current existing vacant parking spaces to the mobile terminal 101.

The vacant parking space selection command receiving module 1803 is configured to receive a vacant parking space selection command sent by the mobile terminal 101.

The target vacant parking space determining module 1804 is configured to determine a target vacant parting space from the found vacant parking spaces according to the vacant parking space selection command.

The first position obtaining module 1805 is configured to obtain, a first position of a terminal node 104 associated with the mobile terminal 101 when the terminal node 104 is placed on a vehicle.

The first position sending module 1806 is configured to send the first position to the mobile terminal 101, so that the mobile terminal 101 draws, on the parking space distribution map of the parking lot, a navigation route from the first position to the target vacant parking space.

Figure 19:
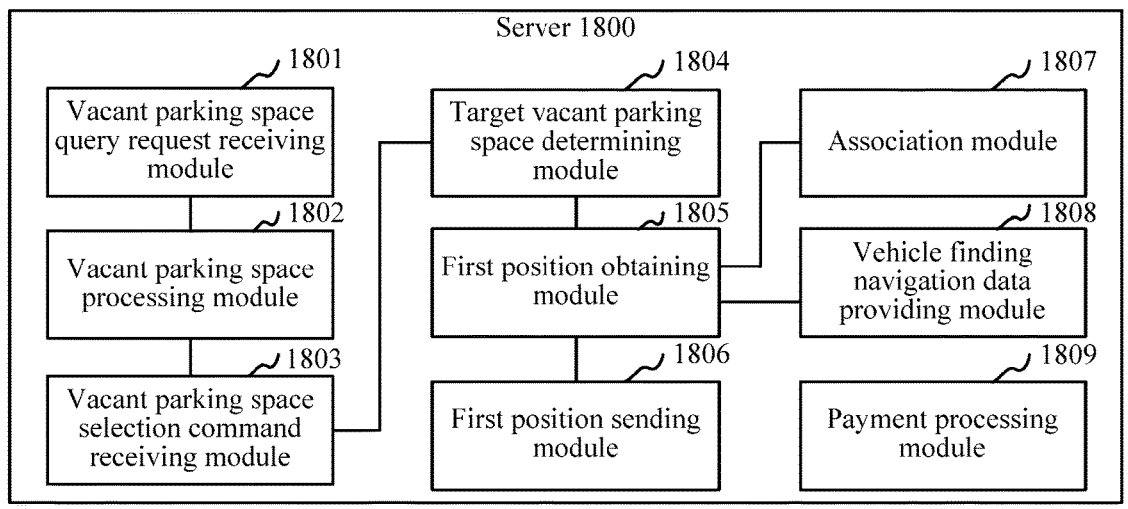
FIG. 19 is a structural block diagram of a server according to another exemplary embodiment.

As shown in FIG. 19, according to an exemplary embodiment, the server 1800 may further include an association module 1807, configured to receive an identifier, uploaded by the mobile terminal 101, of the mobile terminal 101, and an identifier, which is obtained by scanning a graphic code of the terminal node 104, of the terminal node 104; and establish an association between the identifier of the mobile terminal 101 and the identifier of the terminal node 104.

According to an exemplary embodiment, the server 1800 further includes a vehicle finding navigation data providing module 1808, configured to record a parking position when the first position reaches the target vacant parking space, and/or an ultrasonic parking space detection module 107 corresponding to the target vacant parking space detects that the vehicle reaches the target vacant parking space; provide the parking position to the mobile terminal 101; obtain a second position of the terminal node 104 when the terminal node 104 is carried by a vehicle owner; and send the second position to the mobile terminal 101, so that the mobile terminal 101 draws, on the parking space distribution map, a navigation route from the second position to the parking position.

According to an exemplary embodiment, the first position obtaining module 1805 may be further configured to obtain positioning information that is of the terminal node 104 associated with the mobile terminal 101 when the terminal node 104 is placed on the vehicle and that is provided by at least three anchor nodes 106 fixed in the parking lot, where the positioning information of the terminal node 104 is generated by the at least three anchor nodes 106 according to a received wireless signal broadcast by the terminal node 104; and obtain the first position of the terminal node 104 by calculation according to the positioning information of the terminal node 104.

According to an exemplary embodiment, the positioning information of the terminal node 104 includes an RSSI of the received wireless signal broadcast by the terminal node 104, and the first position obtaining module 1805 is further configured to optimize the RSSI by using a Gaussian model to obtain an optimized RSSI and calculate optimized ranging data; and obtain the first position of the terminal node 104 by calculation according to the optimized ranging data and coordinates of the corresponding anchor nodes 106 by using a trilateral positioning algorithm.

According to an exemplary embodiment, the server 103 1800 further includes a payment processing module 1809, configured to obtain a duration starting from time when the vehicle enters the parking lot to time when the vehicle leaves the parking lot and a corresponding fee value that needs to be paid, and send same to the mobile terminal 101; receive a payment request carrying an identifier of a payment account and an identifier of a payee account; transfer the fee value from the payment account to the payee account according to the payment request; and send feedback information of a payment success to the mobile terminal 101.

As regards the foregoing server 103 1800, after taking a terminal node 104, a vehicle owner associates the terminal node 104 with a mobile terminal 101 and places the terminal node 104 on a vehicle, so that the server 103 may obtain a first position of the terminal node 104 as a position where the vehicle is located. The mobile terminal 101 may obtain a parking space distribution map and vacant parking spaces of a parking lot, and marks the vacant parking spaces on the parking space distribution map, so that the vehicle owner may intuitively learn the current existing vacant sparking spaces of the parking lot. After determining a target vacant parking space, the mobile terminal 101 displays a navigation route from the first position to the target vacant parking space, so that the vehicle owner may directly drive to the target vacant parking space according to the navigation route when driving the vehicle, so as to improve the efficiency of finding the vacant parking spaces in the parking lot, and improve the automatic management level of the parking lot.

A person of ordinary skill in the art may understand that all or some of the processes of the methods in the foregoing embodiments may be implemented by a computer program instructing relevant hardware. The program may be stored in a computer readable storage medium, and when the program is executed, the procedure of the methods in the embodiments may be included. The storage medium may be a non-volatile storage medium, such as a magnetic disk, an optical disc, or a read-only memory (ROM), a random access memory (RAM), or the like.

Any combination may be performed on the technical features of the foregoing embodiments. To make descriptions brief, not all possible combinations of the technical features in the foregoing embodiments are described. However, as long as the combinations of the technical features are not contradictory with each other, they should be considered to fall within the scope disclosed in this specification.

The foregoing exemplary embodiments only describe several implementations of this application, and their description is specific and detailed, but cannot therefore be understood as a limitation to the patent scope of the present disclosure. It should be noted that a person of ordinary skill in the art may further make variations and improvements without departing from the ideas of this application, which shall fall within the protection scope of this application. Therefore, the protection scope of this application should be subject to the appended claims.

What is claimed is:

1. A parking space navigation method, performed by a mobile terminal, the method comprising:
    obtaining and displaying a parking space distribution map of a parking lot by using a mobile terminal;
    querying current existing vacant parking spaces of the parking lot from a server;
    marking the current existing vacant parking spaces on the parking space distribution map;
    determining a target vacant parking space from the marked current existing vacant parking spaces;
    obtaining, from the server, a first position of a terminal node associated with the mobile terminal when the terminal node is placed on a vehicle, the first position being obtained from positioning information of the terminal node; and
    drawing, on the parking space distribution map, a navigation route from the first position to the target vacant parking space,
    wherein the positioning information is provided by at least three anchor nodes fixed in the parking lot according to a received wireless signal broadcast by the terminal node and comprises
    a received signal strength indication (RSSI) of a wireless signal that is broadcast by the terminal node, and
    wherein the first position is obtained by calculation according to optimized ranging data and coordinates of the corresponding anchor nodes by using a trilateral positioning algorithm after the RSSI is optimized by using a Gaussian model to obtain an optimized RSSI and the optimized ranging data is calculated.

2. The method according to claim 1, further comprising:
    scanning a graphic code of the terminal node using the mobile terminal to obtain a first identifier of the terminal node; and
    uploading the first identifier of the terminal node and a second identifier of the mobile terminal to the server to establish an association between the first identifier and the second identifier.

3. The method according to claim 1, wherein after drawing the navigation route, the method further comprises:

obtaining a parking position recorded by the server, the parking position being recorded when the first position reaches the target vacant parking space, and/or when an ultrasonic parking space detection module corresponding to the target vacant parking space detects that the vehicle reaches the target vacant parking space;

obtaining, from the server, a second position of the terminal node when the terminal node is carried by a vehicle owner; and drawing, on the parking space distribution map, a navigation route from the second position to the parking position.

4. The method according to claim 1, wherein interaction with the server is performed by a browser that runs on the mobile terminal.

5. A parking space management method performed by a server, the method comprising:

receiving a vacant parking space query request from a mobile terminal;

in response to the request, querying current existing vacant parking spaces of a parking lot according to the vacant parking space query request, and transmitting the current existing vacant parking spaces to the mobile terminal;

receiving a vacant parking space selection command from the mobile terminal;

determining a target vacant parking space from the current existing vacant parking spaces according to the vacant parking space selection command;

obtaining a first position of a terminal node associated with the mobile terminal when the terminal node is placed on a vehicle, the first position being obtained from positioning information of the terminal node; and sending the first position to the mobile terminal for the mobile terminal to draw, on the parking space distribution map of the parking lot, a navigation route from the first position to the target vacant parking space, wherein the positioning information is provided by at least three anchor nodes fixed in the parking lot according to a received wireless signal broadcast by the terminal node and comprises a received signal strength indication (RSSI) of a wireless signal that is broadcast by the terminal node, and wherein the obtaining the first position comprises:

optimizing the RSSI by using a Gaussian model to obtain an optimized RSSI and calculating optimized ranging data; and obtaining the first position of the terminal node by calculation according to the optimized ranging data and coordinates of the corresponding anchor nodes by using a trilateral positioning algorithm.

6. The method according to claim 5, further comprising:
receiving a first identifier of the mobile terminal from the mobile terminal, and a second identifier of a terminal node, which is obtained by scanning a graphic code of the terminal node; and establishing an association between the first identifier and the second identifier.

7. The method according to claim 5, further comprising:
recording a parking position when the first position reaches the target vacant parking space, and/or when an ultrasonic parking space detection module corresponding to the target vacant parking space detects that the vehicle reaches the target vacant parking space, and changing the target vacant parking space to a non-vacant parking space;

providing the parking position to the mobile terminal;

obtaining a second position of the terminal node when the terminal node is carried by a vehicle owner; and sending the second position to the mobile terminal for the mobile terminal to draw, on the parking space distribution map, a navigation route from the second position to the parking position.

8. A mobile terminal comprising at least one microprocessor and a memory storing instructions which, when executed by the microprocessor, cause the microprocessor to:

obtain and display a parking space distribution map of a parking lot;

query current existing vacant parking spaces of the parking lot from a server;

mark the current existing vacant parking spaces on the parking space distribution map;

determine a target vacant parking space from the current existing vacant parking spaces;

obtain, from the server, a first position of a terminal node associated with the mobile terminal when the terminal node is placed on a vehicle, the first position being obtained from positioning information of the terminal node; and draw, on the parking space distribution map, a navigation route from the first position to the target vacant parking space, wherein the positioning information is provided by at least three anchor nodes fixed in the parking lot according to a received wireless signal broadcast by the terminal node and comprises a received signal strength indication (RSSI) of a wireless signal that is broadcast by the terminal node, and wherein the first position is obtained by calculation according to optimized ranging data and coordinates of the corresponding anchor nodes by using a trilateral positioning algorithm after the RSSI is optimized by using a Gaussian model to obtain an optimized RSSI and the optimized ranging data is calculated.

9. The mobile terminal according to claim 8, wherein the instructions, when executed by the microprocessor, further cause the microprocessor to:

scan a graphic code of the terminal node to obtain a first identifier of the terminal node; and transmit the first identifier and a second identifier of the mobile terminal to the server to establish an association between the first identifier and the second identifier.

10. The mobile terminal according to claim 8, wherein the instructions, when executed by the microprocessor, further cause the microprocessor to, after drawing the navigation route from the first position to the target vacant parking space:

obtain a parking position recorded by the server, the parking position being recorded when the first position reaches the target vacant parking space, and/or when an ultrasonic parking space detection module corresponding to the target vacant parking space detects that the vehicle reaches the target vacant parking space;

obtain, from the server, a second position of the terminal node when the terminal node is carried by a vehicle owner; and draw, on the parking space distribution map, a navigation route from the second position to the parking position.

11. The mobile terminal according to claim 8, wherein interaction with the server is performed by a browser that runs on the mobile terminal.

12. A server comprising at least one microprocessor and a memory storing instructions which, when executed by the microprocessor, cause the microprocessor to:
- receive a vacant parking space query request from a mobile terminal;
- in response to the request, query current existing vacant parking spaces of a parking lot according to the vacant parking space query request, and transmit the current existing vacant parking spaces to the mobile terminal;
- receive a vacant parking space selection command from the mobile terminal;
- determine a target vacant parking space from the current existing vacant parking spaces according to the vacant parking space selection command;
- obtain a first position of a terminal node associated with the mobile terminal when the terminal node is placed on a vehicle, the first position being obtained from positioning information of the terminal node; and
- send the first position to the mobile terminal for the mobile terminal to draw, on the parking space distribution map of the parking lot, a navigation route from the first position to the target vacant parking space,
- wherein the positioning information is provided by at least three anchor nodes fixed in the parking lot according to a received wireless signal broadcast by the terminal node and comprises a received signal strength indication (RSSI) of a wireless signal that is broadcast by the terminal node, and
- wherein the obtaining the first position comprises:
- optimizing the RSSI by using a Gaussian model to obtain an optimized RSSI and calculating optimized ranging data; and
- obtaining the first position of the terminal node by calculation according to the optimized ranging data and coordinates of the corresponding anchor nodes by using a trilateral positioning algorithm.

13. The server according to claim 12, wherein the instructions, when executed by the microprocessor, further cause the microprocessor to:
- receive a first identifier of the mobile terminal, and a second identifier of the terminal node that is obtained by scanning a graphic code of the terminal node; and
- establish an association between the first identifier and the second identifier.

14. The server according to claim 12, wherein the instructions, when executed by the microprocessor, further cause the microprocessor to:
- record a parking position when the first position reaches the target vacant parking space, and/or when an ultrasonic parking space detection module corresponding to the target vacant parking space detects that the vehicle reaches the target vacant parking space, and change the target vacant parking space to a non-vacant parking space;
- provide the parking position to the mobile terminal;
- obtain a second position of the terminal node when the terminal node is carried by a vehicle owner; and
- send the second position to the mobile terminal for the mobile terminal to draw, on the parking space distribution map, a navigation route from the second position to the parking position.

* * * * *